(12) United States Patent
Mimura et al.

(10) Patent No.: US 7,218,611 B2
(45) Date of Patent: May 15, 2007

(54) BROADCAST SYSTEM

(75) Inventors: Yoshihiro Mimura, Edinburgh (GB); Shigeaki Watanabe, Kyoto (JP); Tadao Kusudo, Osaka (JP); Tomonori Nakamura, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 645 days.

(21) Appl. No.: 10/482,799

(22) PCT Filed: Jul. 3, 2002

(86) PCT No.: PCT/JP02/06715

§ 371 (c)(1),
(2), (4) Date: Jan. 5, 2004

(87) PCT Pub. No.: WO03/005708

PCT Pub. Date: Jan. 16, 2003

(65) Prior Publication Data

US 2005/0007970 A1 Jan. 13, 2005

(30) Foreign Application Priority Data

Jul. 5, 2001 (JP) .............................. 2001-204330

(51) Int. Cl.
*H04L 12/26* (2006.01)
*H04Q 7/00* (2006.01)
*H04N 7/123* (2006.01)
*H04N 7/16* (2006.01)

(52) U.S. Cl. ...................... 370/241; 370/252; 370/328; 370/522; 455/3.01; 455/3.02; 455/3.04; 455/3.05; 725/116; 725/114; 725/138; 725/144; 725/146

(58) Field of Classification Search ................ 370/241, 370/252, 328, 522; 455/3.01, 3.03, 3.04, 455/3.05

See application file for complete search history.

(56) References Cited

FOREIGN PATENT DOCUMENTS

| JP | 7-154349 | 6/1995 |
| JP | 10-155131 | 6/1996 |
| JP | 10-112846 | 4/1998 |
| JP | 10-135857 | 5/1998 |
| JP | 10-234018 | 9/1998 |
| JP | 10-261251 | 9/1998 |
| JP | 2000-270288 | 9/2000 |
| JP | 2001-86078 | 3/2001 |

*Primary Examiner*—William Trost
*Assistant Examiner*—Julio Perez
(74) *Attorney, Agent, or Firm*—Wenderoth, Lind & Ponack, L.L.P.

(57) ABSTRACT

A broadcast system BS includes a broadcast apparatus 1 and a reception apparatus 2. The broadcast apparatus 1 first receives and stores therein a proxy request PR including at least an identifier assigned to the reception apparatus 2 and a command to be transmitted to the reception apparatus 2. Moreover, the broadcast apparatus 1 extracts the set of the identifier of the reception apparatus 2 and the command for the reception apparatus 2 from the proxy request PR stored therein, and assembles a command packet from the set of the identifier and the command. Then, the broadcast apparatus 1 generates a stream in which the assembled command packet is multiplexed, and sends it out to a broadcast channel. The reception apparatus 2 separates the command packet from the stream sent out to the broadcast channel, and restores the set of the identifier and the command of the reception apparatus 2. Then, the reception apparatus 2 determines whether or not the disassembled command is destined for the present reception apparatus based on the pre-stored identifier of the present reception apparatus and the disassembled identifier of the reception apparatus 2. If so, the reception apparatus 2 stores therein the command destined for the present reception apparatus. The reception apparatus 2 executes the command, which has bee stored as described above.

5 Claims, 22 Drawing Sheets

F I G. 9
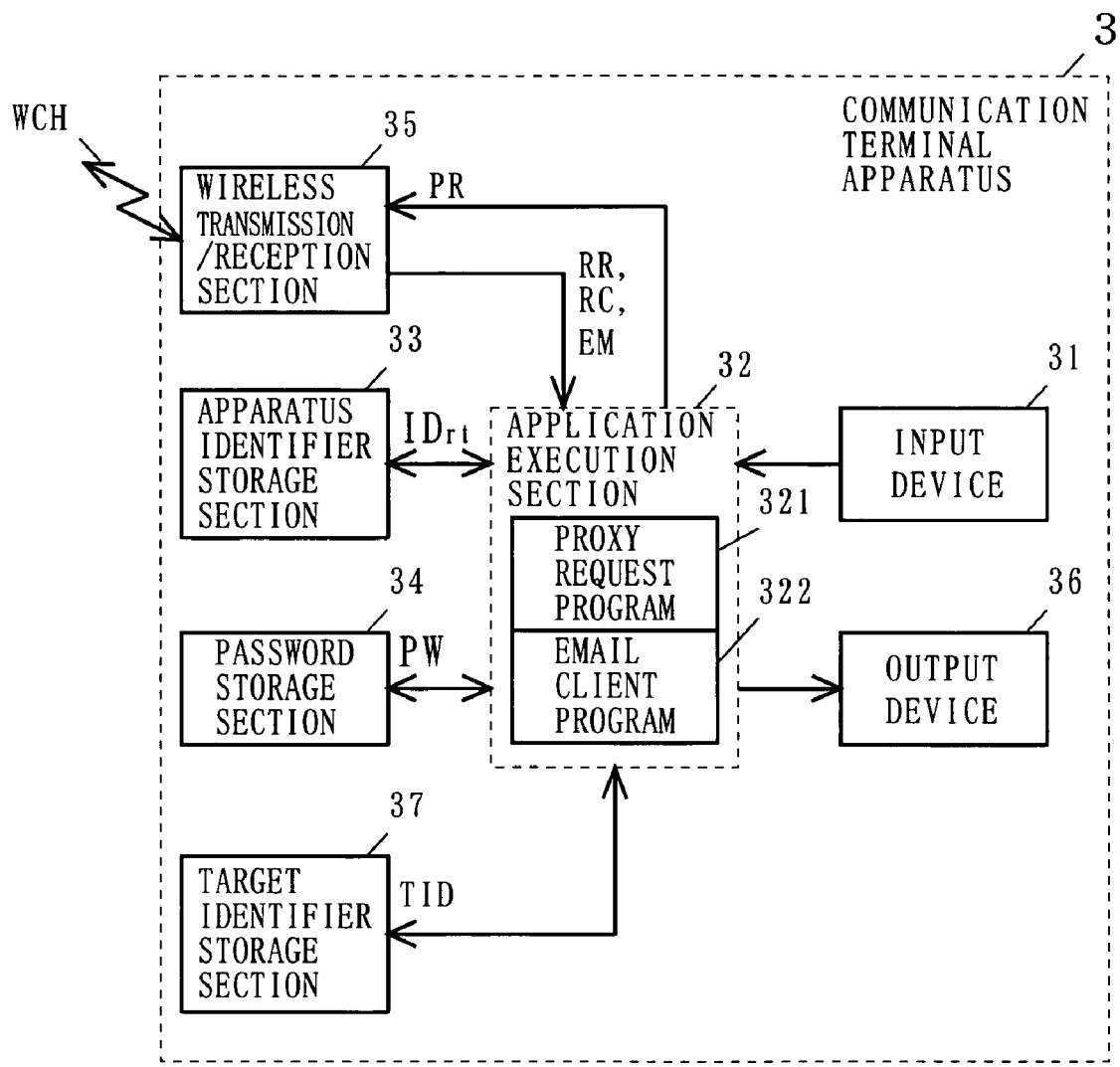

FIG. 13 (a)

| Crec | BCH | Tst | Tnd |
|---|---|---|---|
| SCHEDULED RECORDING (REC) | BROADCAST CHANNEL | BROADCAST START TIME | BROADCAST END TIME |

Cct

FIG. 13 (b)

| Crec | BCH | Tst | Tnd |
|---|---|---|---|
| SCHEDULED RECORDING (REC) | 8 | 6/21 19:00 | 6/21 20:00 |

Cct

BROADCAST SYSTEM

TECHNICAL FIELD

The present invention relates to a broadcast system, and more particularly to a broadcast system in which a broadcast apparatus transmits to a reception apparatus a command for a unit to be controlled, the command being transmitted in a broadcast format.

BACKGROUND ART

FIG. 26 is a block diagram illustrating an overall configuration of a conventional broadcast system. The broadcast system of FIG. 26 is disclosed in Japanese Laid-Open Patent Publication No. 10-155131, and includes a communication terminal apparatus TA1, a server BSV as the broadcast apparatus, a communication terminal apparatus TA2 as the reception apparatus, and a video tape recorder VTR as the unit to be controlled. The communication terminal apparatus TA1 transmits information "recording scheduling request" to the server BSV, which is communicably connected to the communication terminal apparatus TA1 via the Internet INT. In response to the recording scheduling request sent from the communication terminal apparatus TA1, the server BSV transmits personal recording schedule information, as an example of the command, to the communication terminal apparatus TA2 over a text television channel CH. The communication terminal apparatus TA2, capable of receiving televised programs and text, receives a video signal sent over an ordinary broadcast channel, and supplies the received signal to the video tape recorder VTR, which is communicably connected to the communication terminal apparatus TA2. Furthermore, the communication terminal apparatus TA2 sets a recording schedule requested by the communication terminal apparatus TA1 in the video tape recorder VTR according to the personal scheduled recording information sent from the server BSV over the text television channel CH.

Next, technical problems of the conventional broadcast system will be described.

First, while the above publication discloses only one communication terminal apparatus TA2, an actual broadcast system accommodates a number of communication terminal apparatuses TA2. Nevertheless, the server BSV simply sends personal scheduled recording information that arrives at the server BSV while multiplexing it with other signals on the text television channel CH. Therefore, a communication terminal apparatus TA2 may possibly receive personal scheduled recording information which was directed to another communication terminal apparatus TA2. Furthermore, there are a plurality of servers BSV, and they are assigned different text television channels CH. Moreover, the communication terminal apparatus TA2 receives personal scheduled recording information sent over one of the plurality of text television channels CH that is specified by the user. Therefore, in order to reliably perform the scheduled recording, a communication terminal apparatus TA2 needs to be set to a text television channel CH being used by a server BSV when the personal scheduled recording information from the server BSV arrives at the communication terminal apparatus TA2. Therefore, if the appropriate text television channel CH is not selected, the communication terminal apparatus TA2 fails to receive the personal scheduled recording information from the server BSV, thus failing to perform the scheduled recording. As can be seen from the above, the first problem of the conventional broadcast system is that the reception apparatus is likely to fail to accurately receive only those commands that are destined for itself.

Next, while the above publication discloses only one communication terminal apparatus TA1, as with the communication terminal apparatus TA2, personal scheduled recording information arrives at the server BSV from a plurality of communication terminal apparatuses TA1 in an actual broadcast system. Due to the nature of scheduled recording, personal scheduled recording information needs to arrive at the communication terminal apparatus TA2 before the start of the program requested by the communication terminal apparatus TA1. However, the conventional server BSV simply sends personal scheduled recording information that arrives at the server BSV. Therefore, the second problem is that the personal scheduled recording information may not arrive at the communication terminal apparatus TA2 before the start of the program to be recorded by scheduled recording.

Therefore, a first object of the present invention is to provide a broadcast system in which the reception apparatus can receive only those commands that are destined for itself with a higher reliability. Moreover, a second object of the present invention is to provide a broadcast system in which a command sent from the broadcast apparatus arrives at the reception apparatus by a predetermined time.

DISCLOSURE OF THE INVENTION

To achieve the first and second objects above, the present invention has the following aspects. A first aspect of the present invention is directed to a broadcast apparatus for broadcasting a stream to a reception apparatus, comprising: a request reception section for receiving a proxy request including an identifier assigned to the reception apparatus, a command to be transmitted to the reeeption apparatus, and an execution stall time of the command to be transmitted to the reception apparatus; a timer for keeping a current time; a request determination section for determining whether or not to accept the proxy request received by the request reception section by using the execution start time included in the received proxy request and the current time kept by the timer; a proxy request storage device for storing the proxy request that is determined by the request determination section to be acceptable; a command extraction section for extracting a set of an identifier of the reception apparatus and a command for the reception apparatus from the proxy request stored in the proxy request storage device a plurality of times at a predetermined time interval; a command packet assembler for assembling a command packet from the set of the identifier and the command extracted by the command extraction section; a multiplexer for generating a stream in which the command packet assembled by the command packet assembler is multiplexed; and a transmitter for sending out the stream generated by the multiplexer to a broadcast channel. The request determination section includes: a first time calculation section for calculating a first amount of time required from when each command packet is sent out until the command packet arrives at the reception apparatus: a second time calculation section for calculating a second amount of time required from when a first command packet is assembled until a last command packet, including the same set of the identifier and the command as the first packet, is assembled; a reference time calculation section for calculating a reference time by which the proxy request from the reception apparatus should arrive at the present reception apparatus, based on the execution start time included in the proxy request received by the request reception section and the first and second amounts of time calculated by the first and second time calculation sections, respectively; and a determination section for determining that the proxy request received by the request reception section is unacceptable if the current time kept by the timer is after the reference time calculated by the reference time calculation section.

A second aspect of the present invention is directed to a reception apparatus for receiving a stream from a broadcast apparatus, wherein the broadcast apparatus broadcasts, over a pre-assigned broadcast channel, a stream in which a command packet is multiplexed, the command packet being assembled from an identifier assigned to the reception apparatus and a command to be transmitted to the reception apparatus. The reception apparatus includes: a tuner section for receiving the stream sent over the broadcast channel; an apparatus identifier storage section for storing the identifier of the present reception apparatus; a command filtering section for determining whether or not the identifier multiplexed in the stream received by the tuner section matches the identifier of the present reception apparatus stored in the apparatus identifier storage section; a command storage section for storing the command multiplexed in the stream received by the tuner section if it is determined by the command filtering section that the identifiers match each other; a command execution section for executing the command stored in the command storage section; a power supply that can be set to two states of ON and standby; a specified channel storage section for storing, as a specified broadcast channel, information indicating a broadcast channel assigned to the broadcast apparatus; and a power supply monitoring device for monitoring the state of the power supply to transmit a control signal including a specified broadcast channel stored in the specified channel storage section to the tuner section after the power supply transitions from ON to standby, The tuner section sets a receiving frequency band thereof to the specified broadcast channel included in the control signal from the power supply monitoring device. The tuner section, the apparatus identifier storage section, the command filtering section, the command storage section, the command execution section, the power supply monitoring device and the specified channel storage section operate if the power supply is on standby. A third aspect of the present invention is directed to a broadcast method for broadcasting a stream to a reception apparatus, comprising: a request reception step of receiving a proxy request including an identifier assigned to the reception apparatus, a command to be transmitted to the reception apparatus, and an execution start time of the command to be transmitted to the reception apparatus a request determination step of determining whether or not to accept the proxy request received in the request reception step by using the execution start time included in the received proxy request and a current time kept in the broadcast apparatus; a proxy request storage step of storing the proxy request that is determined in the request determination step to be acceptable; a command extraction step of extracting a set of an identifier of the reception apparatus and a command for the reception apparatus from the proxy request stored in the proxy request storage step a plurality of times at a predetermined time interval; a command packet assembling step of assembling a command packet from the set of the identifier and the command extracted in the command extraction step; a multiplexing step of generating a stream in which the command packet assembled in the command packet assembling step is multiplexed; and a send-out step of sending out the stream generated in the multiplexing step to a broadcast channel. The request determination step includes: a first time calculation step of calculating a first amount of time required from when each command packet is sent out until the command packet arrives at the reception apparatus; a second time calculation step of calculating a second amount of time required from when a first command packet is assembled until a last command packet, including the same set of the identifier and the command as the first packet, is assembled; a reference time calculation step of calculating a reference time by which the proxy request from the reception apparatus should arrive at the broadcast apparatus, based on the execution start time included in the proxy request received in the request reception step and the first and second amounts of time calculated in the first and second time calculation steps, respectively; and a determination step of determining that the proxy request received in the request reception step is unacceptable if the current time is after the reference time calculated in the reference time calculation step.

A fourth aspect of the present invention is directed to a reception method used in a reception apparatus for receiving a stream from a broadcast apparatus, wherein the broadcast apparatus broadcasts, over a pre-assigned broadcast channel, a stream in which a command packet is multiplexed, the command packet being assembled from an identifier assigned to the reception apparatus and a command to be transmitted to the reception apparatus. The reception method includes: a reception step of setting a receiving frequency band of a tuner of the reception apparatus to a predetermined broadcast channel so as to receive a stream sent over the set broadcast channel; a command filtering step of determining whether or not the identifier multiplexed in the stream received in the reception step matches an identifier pre-assigned to the reception apparatus; a command storage step of storing the command multiplexed in the stream received in the reception step if it is determined in the command filtering step that the identifiers match each other; a command execution step of executing the command stored in the command storage step; and a control signal transmission step of monitoring a state of a power supply of the reception apparatus that can be set to two states of ON and standby, and transmitting a control signal including a broadcast channel assigned to the broadcast apparatus as a specified broadcast channel to the tuner after the power supply transitions from ON to standby. The receiving frequency band of the tuner is set to the specified broadcast channel included in the control signal from the control signal transmission step. The reception step, the command filtering step, the command storage step, the command execution step and the power supply monitoring step are performed if the power supply is on standby. A fifth aspect of the present invention is directed to a reception apparatus for receiving a stream from a broadcast apparatus, wherein the broadcast apparatus broadcasts, over a pre-assigned broadcast channel, a stream obtained by multiplexing together a command packet and a set of a video packet and an audio packet, the command packet being assembled from an identifier assigned to the reception apparatus and a command to be transmitted to the reception apparatus, and the set of the video packet and the audio packet forming a program to be broadcast from a predetermined broadcast start time to a predetermined broadcast end time. The reception apparatus includes: a first tuner section for setting a receiving frequency band thereof to a broadcast channel specified by a user so as to receive a stream sent over the set broadcast channel; an AV packet separation section for separating the video packet and the audio packet from the stream received by the first tuner section; a second tuner section for setting a receiving frequency band thereof to a broadcast channel used for broadcasting a command packet destined for the present reception apparatus so as to receive a stream sent over the set broadcast channel; an apparatus identifier storage section for storing the identifier of the present reception apparatus; a command filtering section for determining whether or not an identifier multiplexed in the stream received by the second tuner section matches the identifier of the present reception apparatus stored in the apparatus identifier storage section; a command packet separation section for separating a command multiplexed in the stream received by the second tuner section if it is determined by the command filtering section that the identifiers match each other; a command storage section for storing the command separated by the command packet separation section; and a command execution section for executing the command stored in the command storage section. The tuner sections, the apparatus identifier storage section, the command filtering section, the command storage section, the command execution section and the command packet separation section operate if a power supply provided in the reception apparatus is on standby. The AV packet separation section operates if the power supply is not on standby.

A sixth aspect of the present invention is directed to a reception method used in a reception apparatus for receiving a stream from a broadcast apparatus, wherein the broadcast apparatus broadcasts, over a pre-assigned broadcast channel, a stream obtained by multiplexing together a command packet and a set of a video packet and an audio packet, the command packet being assembled from an identifier assigned to the reception apparatus and a command to be transmitted to the reception apparatus, and the set of the video packet and the audio packet forming a program to be broadcast from a predetermined broadcast start time to a predetermined broadcast end time. The reception method includes: a first reception step of receiving a stream sent over a broadcast channel specified by a user; an AV packet separation step of separating the video packet and the audio packet from the stream received in the first reception step; a second reception step of receiving a stream sent over a broadcast channel used for broadcasting a command destined for the reception apparatus; a command filtering step of determining whether or not an identifier multiplexed in the stream received in the second reception step matches an identifier pre-assigned to the reception apparatus; a command packet separation step of separating a command from the stream received in the second reception step if it is determined in the command filtering step that the identifiers match each other; a command storage step of storing the command separated in the command packet separation step; and a command execution step of executing the command stored in the command storage step. The second reception step, the command filtering step, the command packet separation step, the command storage step and the command execution step are performed if a power supply provided in the reception apparatus is on standby. The AV packet separation step is performed if the power supply is not on standby.

BRIEF DESCRIPTION OF THE DRAWINGS

FIG. 9 is a block diagram illustrating a detailed configuration of the communication terminal apparatus 3 of FIG. 1.

FIG. 13(a) is a schematic diagram illustrating an example of a data format of a command Cct that is stored in advance in the application execution section 32 of FIG. 3, and FIG. 13(b) is a schematic diagram illustrating an example of a generated command Cct.

BEST MODE FOR CARRYING OUT THE INVENTION

Figure 1:
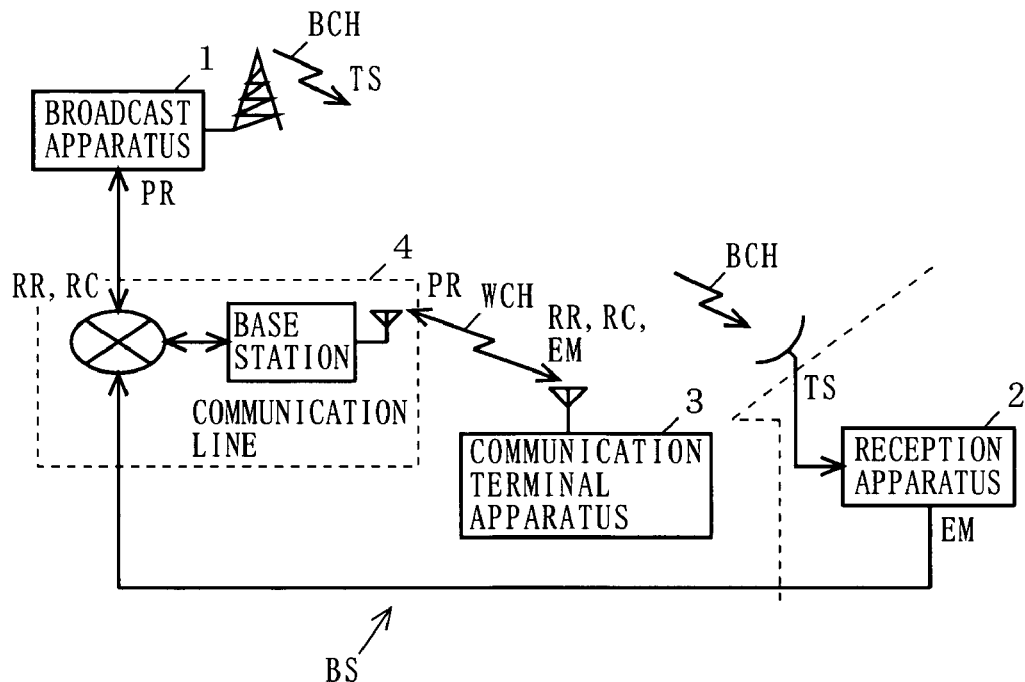
FIG. 1 is a schematic diagram illustrating an overall configuration of a broadcast system BS according to one embodiment of the present invention.

FIG. 1 is a schematic diagram illustrating an overall configuration of a broadcast system BS according to one embodiment of the present invention. The broadcast system BS of FIG. 1 includes: a broadcast apparatus 1 owned by a broadcaster; a reception apparatus 2 and a communication terminal apparatus 3 owned by the user; and a communication line 4. Briefly speaking, the broadcast apparatus 1 receives and stores therein a proxy request PR sent out from the communication terminal apparatus 3 via the communication line 4. The proxy request PR includes a command Cct to be transmitted to the reception apparatus 2, and is information with which the communication terminal apparatus 3 requests the broadcast apparatus 1 to transmit the command Cct on behalf of the user. In the present embodiment, the command Cct is, for example, a command for scheduling for recording a program to be broadcast (hereinafter referred to as a "broadcast program") from a predetermined broadcast start time Tst to a predetermined broadcast end time Tnd over a broadcast channel BCH that is assigned to the broadcast apparatus 1.

Figure 2:
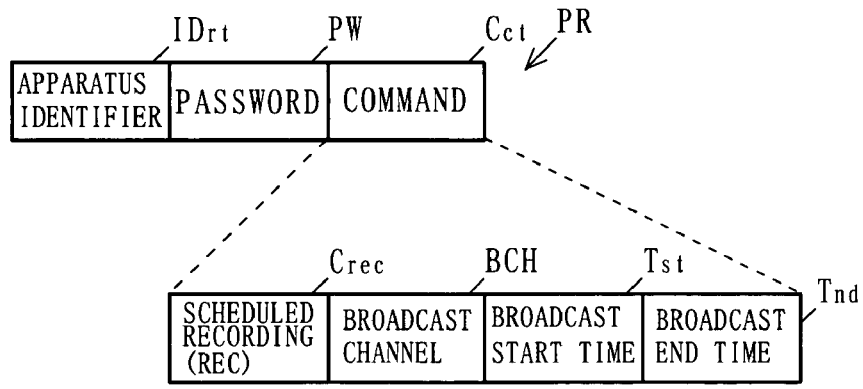
FIG. 2(a) and FIG. 2(b) are schematic diagrams illustrating a data structure of a proxy request PR transmitted to a broadcast apparatus 1 by a communication terminal apparatus 3 of FIG. 1.
Figure 2:
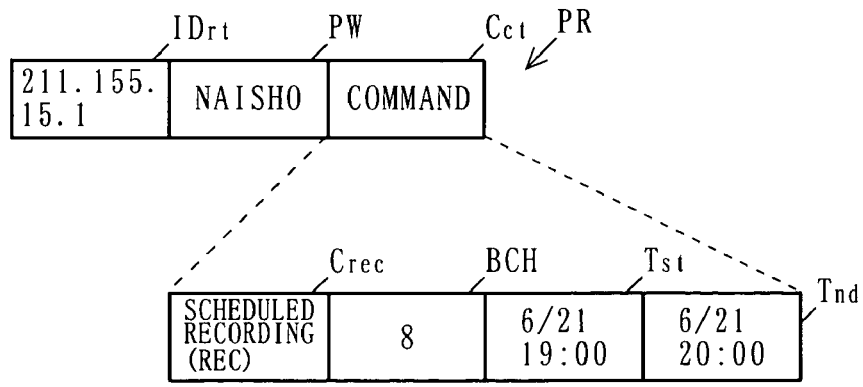

FIG. 2(a) is a schematic diagram illustrating an example of a data structure of the proxy request PR described above. In FIG. 2(a), the proxy request PR includes an apparatus identifier IDrt, a password PW and the command Cct. The apparatus identifier IDrt is an identifier pre-assigned to the reception apparatus 2, and is typically composed of a string of numbers. The password PW is composed of a string of characters or symbols, or a string of characters and symbols, which is determined by the user. The command Cct includes a scheduled recording command Crec, the broadcast channel BCH used for transmitting a broadcast program to be recorded by scheduled recording, and the broadcast start time Tst and the broadcast end time Tnd of the broadcast program. In the following description, a broadcast program to be recorded by scheduled recording will be referred to as a "recording-scheduled broadcast program". The broadcast start time Tst and the broadcast end time Tnd also include information indicating the month and date. FIG. 2(b) is a schematic diagram illustrating a specific example of the proxy request PR illustrated in FIG. 2(a). In FIG. 2(b), the apparatus identifier IDrt is "211.155.15.1", the password PW is "NAISHO", the broadcast channel BCH is "8", the broadcast start time Tst is "19:00 June 21", and the broadcast end time Tnd is "20:00 June 21".

The broadcast apparatus 1 of FIG. 1 generates a transport stream (hereinafter simply referred to as a "stream") TS by multiplexing the proxy request PR stored therein with video data Dv and audio data Da, which are pre-stored therein. The broadcast apparatus 1 transmits the generated stream TS to the reception apparatus 2 over the broadcast channel BCH. In some cases, the broadcast apparatus 1 may receive an unacceptable proxy request PR. Such a proxy request PR is typically one that arrives at the broadcast apparatus 1 after a reference time Tref to be described later. The broadcast apparatus 1 discards such a proxy request PR. Then, the broadcast apparatus 1 generates a request_rejected signal RR which is information that indicates that the proxy request PR was not accepted, and sends out the request_rejected signal RR to the communication line 4. If the proxy request PR is accepted, the broadcast apparatus 1 transmits a request_accepted signal RC which is information that indicates the acceptance of the proxy request PR, to the communication terminal apparatus 3 via the communication line 4.

Figure 3:
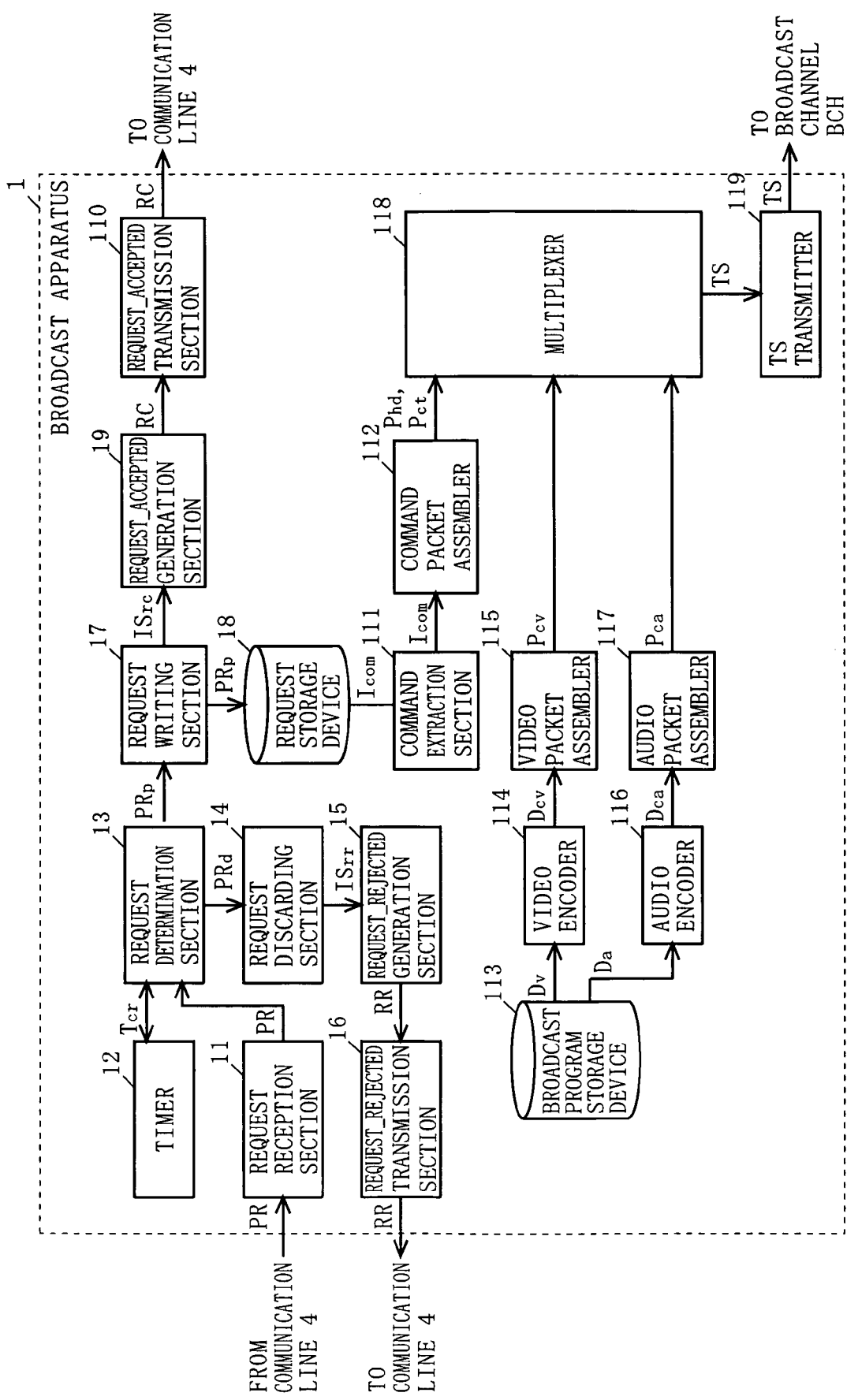
FIG. 3 is a block diagram illustrating a detailed configuration of the broadcast apparatus 1 of FIG. 1.

FIG. 3 is a block diagram illustrating a detailed configuration of the broadcast apparatus 1 as described above. In FIG. 3, the broadcast apparatus 1 includes a request reception section 11, a timer 12, a request determination section 13, a request discarding section 14, a request_rejected generation section 15, a request_rejected transmission section 16, a request writing section 17, a request storage device 18, a request_accepted generation section 19, a request_accepted transmission section 110, a command extraction section 111, a command packet assembler 112, a broadcast program storage device 113, a video encoder 114, a video packet assembler 115, an audio encoder 116, an audio packet assembler 117, a multiplexer 118, and a TS transmitter 119.

The request reception section 11 receives the proxy request PR sent out from the communication terminal apparatus 3 via the communication line 4, and passes the proxy request PR to the request determination section 13. The timer 12 keeps a current time Tcr, and returns the current time Tcr to the request determination section 13 in response to a request by the request determination section 13. The request determination section 13 requests the timer 12 to send the current time Tcr each time the request determination section 13 receives the proxy request PR from the request reception section 11. Furthermore, the request determination section 13 determines whether or not to accept the received proxy request PR based on the current time Tcr received from the timer 12. More specifically, the request determination section 13 determines whether or not the received current time Tcr is after the reference time Tref to be described later. If the current time Tcr is after the reference time Tref, the request determination section 13 determines that the proxy request PR is unacceptable, and passes the proxy request PR to the request discarding section 14 as a proxy request PRd. The request discarding section 14 discards the received proxy request PRd, and gives the request_rejected generation section 15 an instruction ISrr to generate the request_rejected signal RR. In response to the reception of the instruction ISrr, the request_rejected generation section 15 generates the request_rejected signal RR and passes it to the request_rejected transmission section 16. The request_rejected transmission section 16 sends out the received request_rejected signal RR to the communication line 4.

If the request determination section 13 determines that the current time Tcr is the same or before the reference time Tref, the request determination section 13 accepts the received proxy request PR and passes it to the request writing section 17 as a proxy request PRp. The request writing section 17 writes the received proxy request PRp to the request storage device 18, and gives the request_accepted generation section 19 an instruction ISrc to generate the request_accepted signal RC. In response to the instruction ISrc, the request_accepted generation section 19 generates the request_accepted signal RC and passes it to the request_accepted transmission section 110. The request_accepted transmission section 110 sends out the received request_accepted signal RC to the communication line 4.

Moreover, the command extraction section 111 periodically selects a predetermined number Nmux of proxy requests PRp from the request storage device 18, and periodically selects and reads out, as an information set Icom, the apparatus identifier IDrt, the password PW and the command Cct of each of the selected proxy requests PRp. The broadcast system BS has a predetermined bandwidth BWct for transmitting a command packet Pct assembled by the command packet assembler 112. Nmux is a natural number equal to or greater than 1, and the number is appropriately predetermined according to the bandwidth BWct. Nmux is also the number of commands Cct to be multiplexed in the stream TS each time the multiplexer 118 performs step S33 (see FIG. 16). The command extraction section 111 passes all of the read-out information sets Icom to the command packet assembler 112. The command packet assembler 112 assembles one command packet Pct per one information set Icom. Furthermore, the command packet assembler 112 assembles one header packet Phd so that the command packet Pct can be accurately separated at the reception apparatus 2. Upon completion of the packet assembling process described above, the command packet assembler 112 outputs the header packet Phd and the command packet Pct in this order to the multiplexer 118.

Figure 4:
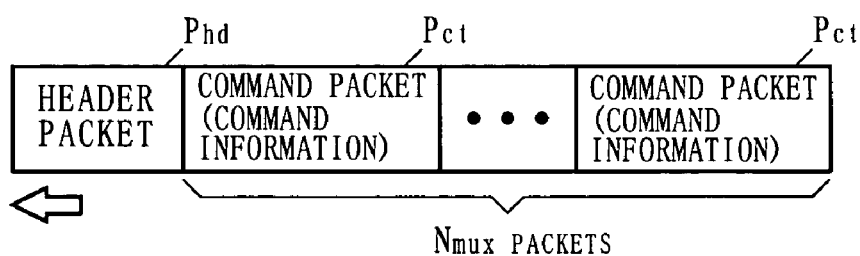
FIG. 4(a) and FIG. 4(b) are schematic diagrams illustrating a series including a header packet Phd and Nmux command packets Pct outputted from a command packet assembler 112 of FIG. 3.
Figure 4:
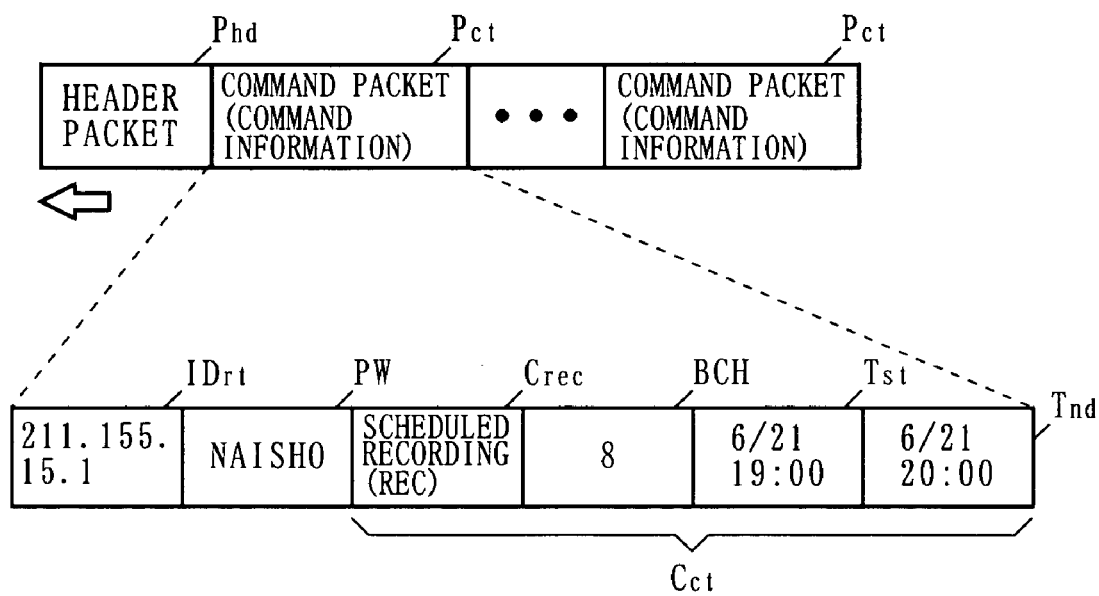

FIG. 4(a) is a schematic diagram illustrating an example of a series including a header packet Phd and command packets Pct outputted from the command packet assembler 112, and FIG. 4(b) is a schematic diagram illustrating a specific example of a series including a header packet Phd and command packets Pct that is outputted from the command packet assembler 112 if the command extraction section 111 selects the proxy request PR illustrated in FIG. 2(b) as the information set Icom.

The broadcast program storage device 113 typically stores a plurality of sets of the video data Dv and the audio data Da. Each set of the video data Dv and the audio data Da represents one program. At the broadcast start time Tst of the program composed of the video data Dv and the audio data Da, the video data Dv and the audio data Da are read out from the broadcast program storage device 113 and outputted to the video encoder 114 and the audio encoder 116, respectively. The video encoder 114 encodes the received video data Dv according to a predetermined video encoding scheme to generate encoded video data Dcv. The video encoder 114 outputs the generated video data Dcv to the video packet assembler 115. The video packet assembler 115 assembles a video packet Pcv from the received video data Dcv and outputs it to the multiplexer 118. The audio encoder 116 encodes the audio data Da outputted from the broadcast program storage device 113 according to a predetermined audio encoding scheme to generate encoded audio data Dca. The audio encoder 116 outputs the generated audio data Dca to the audio packet assembler 117. The audio packet assembler 117 assembles an audio packet Pca from the received audio data Dca and outputs it to the multiplexer 118. The broadcast system BS has a predetermined bandwidth BWav for transmitting the video packet Pcv and the audio packet Pca. The video encoder 114 and the audio encoder 116 described above perform their encoding processes according to the bandwidth BWav.

The multiplexer 118 generates the stream TS by multiplexing together the video packet Pcv from the video packet assembler 115, the audio packet Pca from the audio packet assembler 117, and the header packet Phd and the command packet Pct from the command packet assembler 112. The multiplexer 118 outputs the generated stream TS to the TS transmitter 119. The TS transmitter 119 sends out the received stream TS to the broadcast channel BCH.

Figure 5:
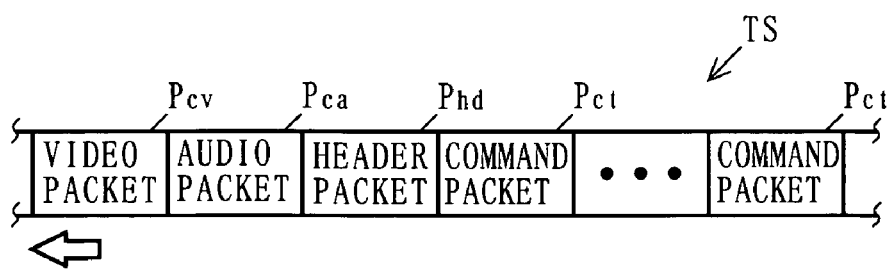
FIG. 5(a) and FIG. 5(b) are schematic diagrams illustrating a transport stream TS sent out from a TS transmitter 119 of FIG. 3.
Figure 5:
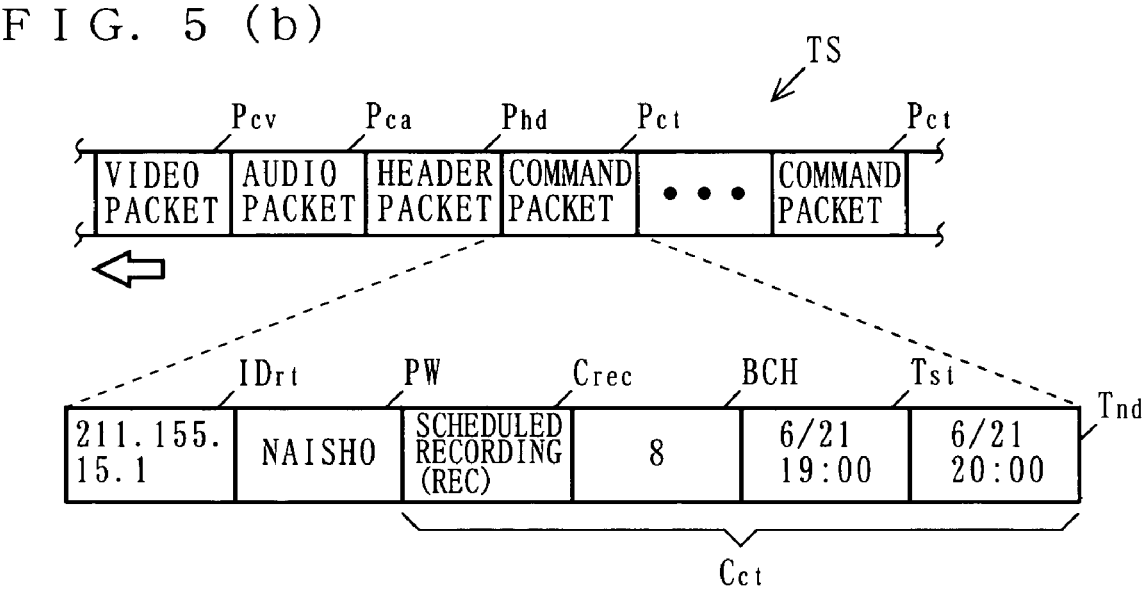

FIG. 5(a) is a schematic diagram illustrating an example of the stream TS sent out from the TS transmitter 119, and FIG. 5(b) is a schematic diagram illustrating the structure of the stream TS that is outputted from the multiplexer 118 if the command packet Pct illustrated in FIG. 4(b) is outputted by the command packet assembler 112.

The reception apparatus 2 of FIG. 1 is typically a set-top box which is placed indoors, and receives the stream TS sent over the broadcast channel BCH. As a characteristic process of the present embodiment, the reception apparatus 2 separates the command Cct destined for itself, which has been multiplexed in the received stream TS, and stores it in an internal command storage section 211 (see FIG. 6). Furthermore, the reception apparatus 2 executes a scheduled recording from the broadcast start time Tst to the broadcast end time Tnd, which are specified by the stored command Cct. In the following description, the time period from the broadcast start time Tst to the broadcast end time Tnd will be referred to as a "scheduled time period TPrp". As the scheduled recording is executed, the reception apparatus 2 separates the video packet Pcv and the audio packet Pca of the recording-scheduled broadcast program from the received stream TS and stores them in an internal scheduled program storage device 218 (see FIG. 6) during the scheduled time period TPrp. If the command Cct cannot be stored in the command storage section 211 for some reason, the reception apparatus 2 generates an error message EM notifying the communication terminal apparatus 3 that the command Cct cannot be stored, and sends out the error message EM to the communication line 4.

Figure 6:
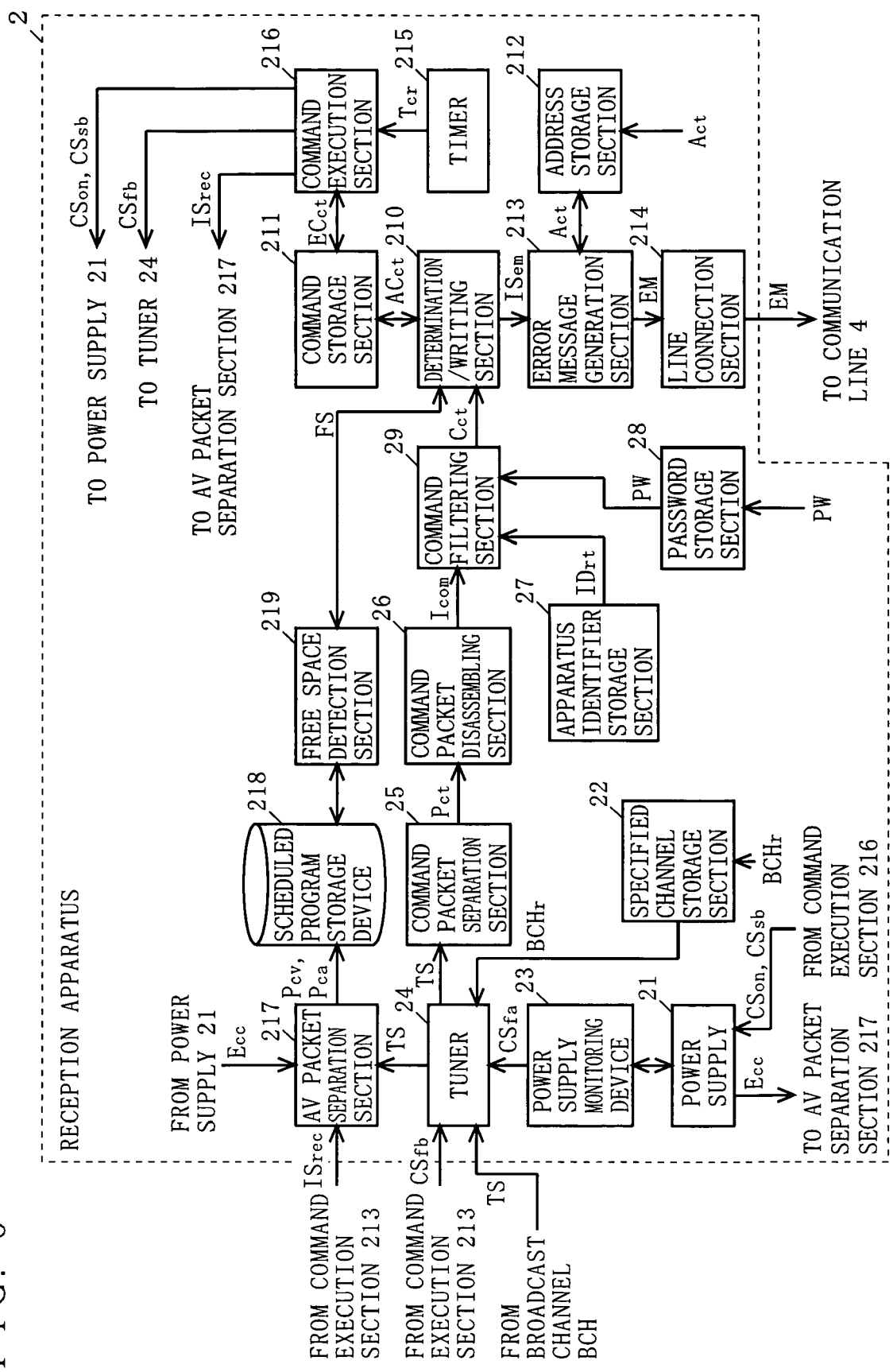
FIG. 6 is a block diagram illustrating a detailed configuration of a reception apparatus 2 of FIG. 1.

FIG. 6 is a block diagram illustrating a detailed configuration of the reception apparatus 2 as described above. In FIG. 6, the reception apparatus 2 includes a power supply 21, a specified channel storage section 22, a power supply monitoring device 23, a tuner 24, a command packet separation section 25, a command packet disassembling section 26, an apparatus identifier storage section 27, a password storage section 28, a command filtering section 29, a determination/writing section 210, the command storage section 211, an address storage section 212, an error message generation section 213, a line connection section 214, a timer 215, a command execution section 216, an AV packet separation section 217, the scheduled program storage device 218, and a free space detection section 219.

The power supply 21 is typically set to one of three states (ON, OFF and standby) by the user operating a switch (not shown) of the reception apparatus 2. In the present embodiment, while the power supply 21 is ON, the power supply 21 supplies the driving voltage to all of the components illustrated in FIG. 6 (from the specified channel storage section 22 to the free space detection section 219). Note that FIG. 6 only shows a driving voltage Ecc to the AV packet separation section 217 for the sake of simplicity. While the power supply 21 is on standby, the power supply 21 supplies the driving voltage at least to all of the components except for the AV packet separation section 217. What happens while the power supply 21 is OFF will not be described herein as it is irrelevant to the present embodiment.

The specified channel storage section 22 stores information that represents the broadcast channel BCH specified by the user. In the following description, the broadcast channel stored in the specified channel storage section 22 will be referred to as a "specified broadcast channel BCHr". The specified broadcast channel BCHr will now be described in detail. In the present embodiment, the broadcaster provides, in addition to the program broadcasting service of broadcasting programs by using the broadcast apparatus 1 of FIG. 1, another service of transmitting the command Cct to the reception apparatus 2 on behalf of the user (hereinafter referred to as a "proxy service"). The specified broadcast channel BCHr is a broadcast channel BCH assigned to a broadcaster that is contracted by the user to render a proxy service for the user.

The power supply monitoring device 23 typically detects the time at which the power supply 21 transitions from ON to standby. After detecting the transition, the power supply monitoring device 23 generates a control signal CSfa and outputs it to the tuner 24. The control signal CSfa is a signal instructing to set the receiving frequency band of the tuner 24 to the specified broadcast channel BCHr.

If the power supply 21 becomes ON, the tuner 24 sets the receiving frequency band to the broadcast channel BCH, which is specified by the user using an input device (not shown). Moreover, in response to the reception of the control signal CSfa from the power supply monitoring device 23, the tuner 24 extracts the specified broadcast channel BCHr from the specified channel storage section 22, and sets the receiving frequency band to the extracted channel. Moreover, in response to the reception of a control signal CSfb from the command execution section 216, the tuner 24 sets the receiving frequency band to the broadcast channel BCH specified by the control signal CSfb. The control signal CSfb is a signal instructing to set the receiving frequency band of the tuner 24 to the broadcast channel BCH notified by the command execution section 216 in order to execute a scheduled recording. The tuner 24 receives the stream TS transmitted over the set broadcast channel BCH, and outputs the received stream TS to the command packet separation section 25 and the AV packet separation section 217.

The command packet separation section 25 separates each command packet Pct multiplexed in the received stream TS (see FIG. 5(a) and FIG. 5(b)) according to the preceding header packet Phd, and passes the separated command packet Pct to the command packet disassembling section 26. The command packet disassembling section 26 disassembles the received command packet Pct to restore the information set Icom. The command packet disassembling section 26 passes the restored information set Icom to the command filtering section 29.

The apparatus identifier storage section 27 and the password storage section 28 store the apparatus identifier IDrt and the password PW, respectively. Note that in the following description, the apparatus identifier IDrt and the password PW that are stored in the apparatus identifier storage section 27 and the password storage section 28 will be referred to as a "local apparatus identifier IDrt" and a "local password PW", respectively. The command filtering section 29 filters information sets Icom received from the command packet disassembling section 26 by using both of the local apparatus identifier IDrt and the local password PW stored in the apparatus identifier storage section 27 and the password storage section 28, respectively. More specifically, the command filtering section 29 determines that the received information set Icom is valid only if the local apparatus identifier IDrt and the local password PW completely match the apparatus identifier IDrt and the password PW, respectively, which are included in the information set Icom. In the present embodiment, a valid information set Icom means a command packet Pct that is generated from a proxy request PRr generated as intended by the user and that is destined for the present reception apparatus. Thus, an information set Icom whose apparatus identifier IDrt does not match is regarded as not being destined for the present reception apparatus, and an information set Icom whose password PW does not match is regarded as not being one that has been generated by the user operating the communication terminal apparatus 3. If the command filtering section 29 determines that the received information set Icom is valid, the command filtering section 29 extracts the command Cct from the information set Icom and passes it to the determination/writing section 210. In contrast, if it is determined that the information set Icomis invalid, the command filtering section 29 discards the information set Icom.

Figure 7:
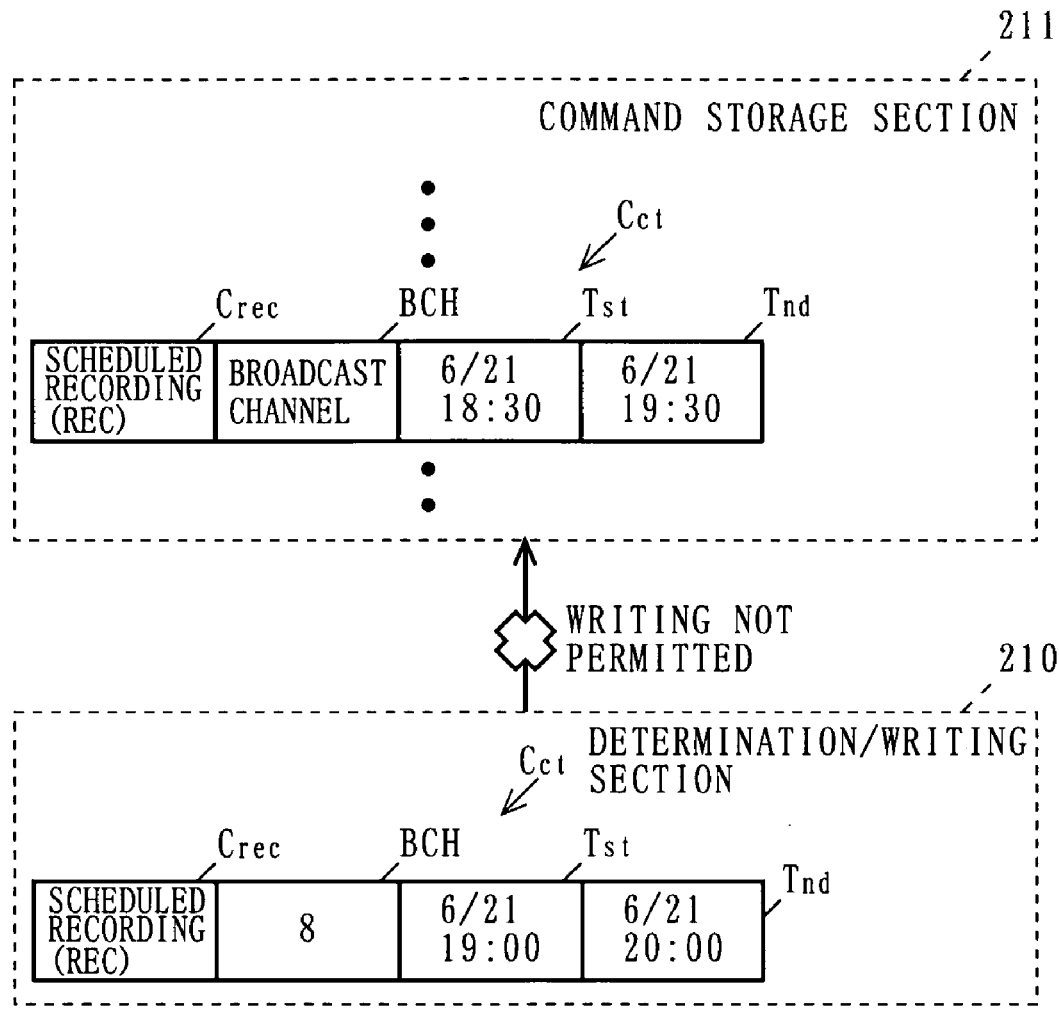
FIG. 7 is a schematic diagram illustrating an example of a command Cct that should not be stored in a command storage section 211 of FIG. 2.

The determination/writing section 210 determines whether or not to write the received command Cct to the command storage section 211. As illustrated in FIG. 2(a) and FIG. 2(b), the command Cct includes the broadcast start time Tst and the broadcast end time Tnd. The command storage section 211 stores a number of commands Cct written by the determination/writing section 210. Thus, in order to properly execute scheduled recordings, two commands Cct whose scheduled time periods TPrp overlap each other should not both be stored. For example, consider a case where a command Cct that has "18:30 June 21" as the broadcast start time Tst and "19:30 June 21" as the broadcast end time Tnd is already stored in the command storage section 211, as illustrated in FIG. 7. In such a case, the command Cct set in the proxy request PR illustrated in FIG. 2(b) should not be stored in the command storage section 211. The reason is that these commands Cct have a temporal overlap from 19:00 to 19:30 on June 21. From such a point of view, the determination/writing section 210 extracts the scheduled time period TPrp from the received information set Icom, and determines whether or not the command storage section 211 already contains any scheduled time period TPrp that overlaps the extracted scheduled time period TPrp. In the following description, the determination process will be referred to as a "schedule overlap determination process".

Moreover, the scheduled program storage device 218 stores the video packet Pcv and the audio packet Pca in a storage area of a finite capacity. Therefore, in order to properly execute a scheduled recording, the scheduled program storage device 218 needs to have a sufficient free space FS for storing the recording-scheduled broadcast program specified by the command Cct. From such a point of view, the free space detection section 219 detects the free space FS of the scheduled program storage device 218 in response to a request from the determination/writing section 210, and sends back the detected free space FS to the determination/writing section 210. The determination/writing section 210 estimates a capacity SS that is required for storing the recording-scheduled broadcast program based on the scheduled time period TPrp in the received information set Icom. The determination/writing section 210 determines whether or not the estimated capacity SS exceeds the free space FS from the free space detection section 219. The determination process will hereinafter be referred to as a "capacity determination process".

The determination/writing section 210 performs the schedule overlap determination process and the capacity determination process for the received command Cct. If both determination results are "No", the determination/writing section 210 permits the command Cct to be written, and writes the command Cct as a command ACct in the command storage section 211. If at least one of the determination results is "YES", the determination/writing section 210 discards the received command Cct without storing it in the command storage section 211, and gives the error message generation section 213 an instruction ISem to generate the error message EM.

The command storage section 211 is a non-volatile memory device, and stores the command ACct, as is apparent from the above. The address storage section 212 stores an address Act specified by the user. The address Act is an address uniquely identifying the communication terminal apparatus 3, and is typically a string of characters or numbers. In the present embodiment, it is assumed that the address Act is "address@pop.ne.jp". In response to the instruction ISem, the error message generation section 213 extracts the address Act from the address storage section 212, and generates the error message EM. The error message generation section 213 passes the generated error message EM to the line connection section 214. The line connection section 214 connects itself to the communication line 4 in response to the arrival of the error message EM, and then sends out the received error message EM to the communication line 4.

Figure 8:
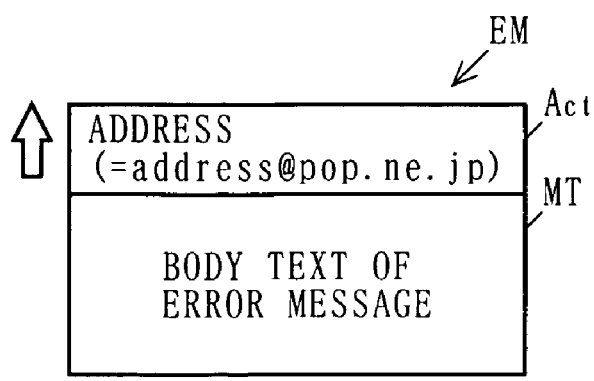
FIG. 8 is a schematic diagram illustrating a data structure of an error message EM generated by an error message generation section 213 of FIG. 2.

FIG. 8 is a schematic diagram illustrating an example of a data structure of the error message EM generated by the error message generation section 213. In FIG. 8, the error message EM is shown to be in the form of electronic mail, and includes at least the address Act and a body text MT indicating that the command Cct could not be written to the command storage section 211.

The timer 215 keeps the current time Tcr, and passes the current time Tcr to the command execution section 216 at a predetermined time interval. The command execution section 216 accesses the command storage section 211 each time the current time Tcr arrives from the timer 215. Then, the command execution section 216 searches for a command Cct whose broadcast start time Tst matches the received current time Tcr from among all the commands Cct in the command storage section 211. In the following description, a command Cct that meets this condition will be referred to as a "command ECct". Upon finding a command ECct, the command execution section 216 starts executing the command ECct. More specifically, the command execution section 216 first generates a control signal CSon instructing to turn the power supply 21 ON, and outputs it to the power supply 21. In response to the received control signal CSon, the power supply 21 supplies the driving voltage Ecc to the AV packet separation section 217. Moreover, the command execution section 216 extracts the broadcast channel BCH of the recording-scheduled broadcast program from the command ECct, generates the control signal CSfb including the extracted broadcast channel BCH, and outputs it to the tuner 24. The tuner 24 sets the receiving frequency band to the broadcast channel BCH specified by the received control signal CSfb to receive the stream TS, as described above. Furthermore, the command execution section 216 generates a recording instruction ISrec instructing the AV packet separation section 217 to store the video packet Pcv and the audio packet Pca separated from the received stream TS in the scheduled program storage device 218. The command execution section 216 outputs the generated recording instruction ISrec to the AV packet separation section 217. The AV packet separation section 217 operates as instructed by the recording instruction ISrec. As a result, the scheduled program storage device 218 starts storing the video packet Pcv and the audio packet Pca separated by the AV packet separation section 217. In other words, the recording of the recording-scheduled broadcast program starts. Furthermore, the command execution section 216 terminates the execution of the command ECct if it recognizes that the broadcast end time Tnd of the command ECct matches the current time Tcr received from the timer 215. More specifically, the command execution section 216 generates a control signal CSsb instructing to set the power supply 21 on standby, and outputs it to the power supply 21. In response to the received control signal CSsb, the power supply 21 transitions to standby, and stops supplying the driving voltage Ecc to the AV packet separation section 217. As a result, the recording of the recording-scheduled broadcast program ends. Furthermore, as the power supply 21 is set on standby, the power supply monitoring device 23 generates the control signal CSfa as described above, and transmits it to the tuner 24.

The communication terminal apparatus 3 of FIG. 1 is preferably a mobile phone that generates the proxy request PR as described above through the operation by the user and sends it out to a wireless channel WCH. The sent-out proxy request PR is received by the base station on the communication line 4 via the wireless channel WCH, and is then passed to the broadcast apparatus 1. Moreover, the base station on the communication line 4 sends out, onto the wireless channel WCH, the request_rejected signal RR or the request_accepted signal RC from the broadcast apparatus 1 or the error message EM from the reception apparatus 2. If the communication terminal apparatus 3 receives the request_rejected signal RR or the request_accepted signal RC or the error message EM from the wireless channel WCH, the communication terminal apparatus 3 outputs an image or a sound indicating the non-acceptance or acceptance of the command Cct by the broadcast apparatus 1 or that the reception apparatus 2 cannot execute the command Cct.

FIG. 9 is a block diagram illustrating a detailed configuration of the communication terminal apparatus 3 as described above. In FIG. 9, the communication terminal apparatus 3 includes an input device 31, an application execution section 32, an apparatus identifier storage section 33, a password storage section 34, a wireless transmission/reception section 35, an output device 36, being a display device or a loudspeaker, and a target identifier storage section 37.

The input device 31 is typically a keyboard. The user operates the input device 31 to input information necessary for performing data communications in the present broadcast system BS. Although not shown in FIG. 9 for the sake of simplicity, the inputted information includes the apparatus identifier IDrt and the password PW as described above, as well as the broadcast channel BCH, the broadcast start time Tst, and the broadcast end time Tnd. These inputted information are sent to the application execution section 32. The application execution section 32 includes a processor, a ROM (Read Only Memory) and a RAM (Random Access Memory), and stores a computer program for making a proxy request (hereinafter referred to as a "proxy request program") 321 and an email client program 322 in the ROM. The application execution section 32 executes the proxy request program 321 to generate the proxy request PR as described above, or to receive the request_rejected signal RR or the request_accepted signal RC as described above. Moreover, the application execution section 32 executes the email client program 322 to receive the error message EM. The apparatus identifier storage section 33 and the password storage section 34 store the apparatus identifier IDrt and the password PW, respectively, which are sent from the application execution section 32. The wireless transmission/reception section 35 performs a predetermined modulation or multiplexing operation on the proxy request PR received from the application execution section 32, and sends out the resultant signal to the wireless channel WCH. Moreover, the wireless transmission/reception section 35 performs a predetermined demodulation or separation operation on the request_rejected signal RR, the request_accepted signal RC or the error message EM received from the wireless channel WCH, and passes the resultant signal to the application execution section 32. Note that the target identifier storage section 37 will not be described now, as it is a component that is needed in the second variant to be described later.

Next, settings to be made before performing data communications in the broadcast system BS will be described. The user operates the input device 31 of the communication terminal apparatus 3 to activate the application execution section 32 while specifying the proxy request program 321. Then, the user operates the input device 31 to input the apparatus identifier IDrt. The application execution section 32 stores the inputted apparatus identifier IDrt in the apparatus identifier storage section 33. Furthermore, the user operates the input device 31 to input the password PW. The application execution section 32 stores the inputted password PW in the password storage section 34. Furthermore, the user operates an input device (not shown) of the reception apparatus 2 to input the same password PW as that stored in the password storage section 34 and to input the address Act. As a result of the input operation described above, the inputted password is stored as the local password PW in the apparatus identifier storage section 27 of the reception apparatus 2. The inputted address Act is stored in the address storage section 212. Note that the same apparatus identifier IDrt as that set in the apparatus identifier storage section 33 is stored in the apparatus identifier storage section 27 of FIG. 6 as the local apparatus identifier IDrt before shipped from the factory, for example. Furthermore, the user makes a contract with a broadcaster for a proxy service. After the contract is made, the user or the broadcaster operates an input device (not shown) of the reception apparatus 2 of the user to input the broadcast channel BCH used by the contracted broadcaster as the specified broadcast channel BCHr. The inputted specified broadcast channel BCHr is stored in the specified channel storage section 22.

Next, data communications to be performed in the present broadcast system BS will be described in detail.

Figure 10:
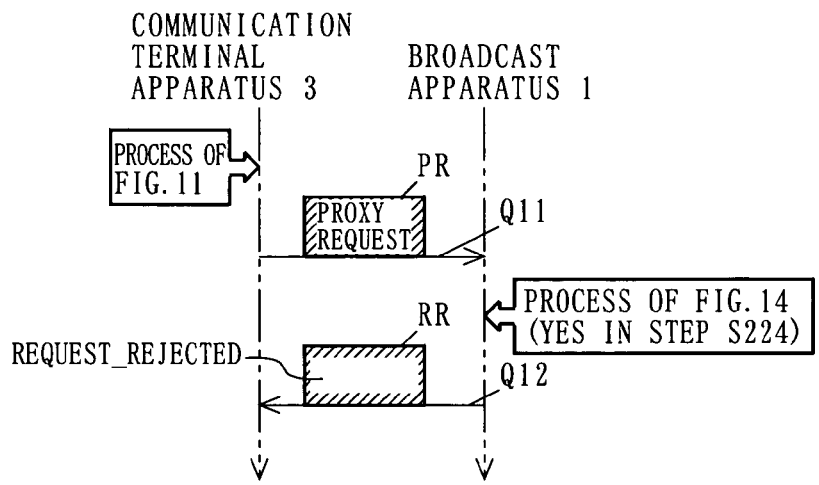
FIG. 10(a) and FIG. 10(b) are sequence charts illustrating a procedure for data communications performed in the broadcast system BS of FIG. 1.
Figure 10:
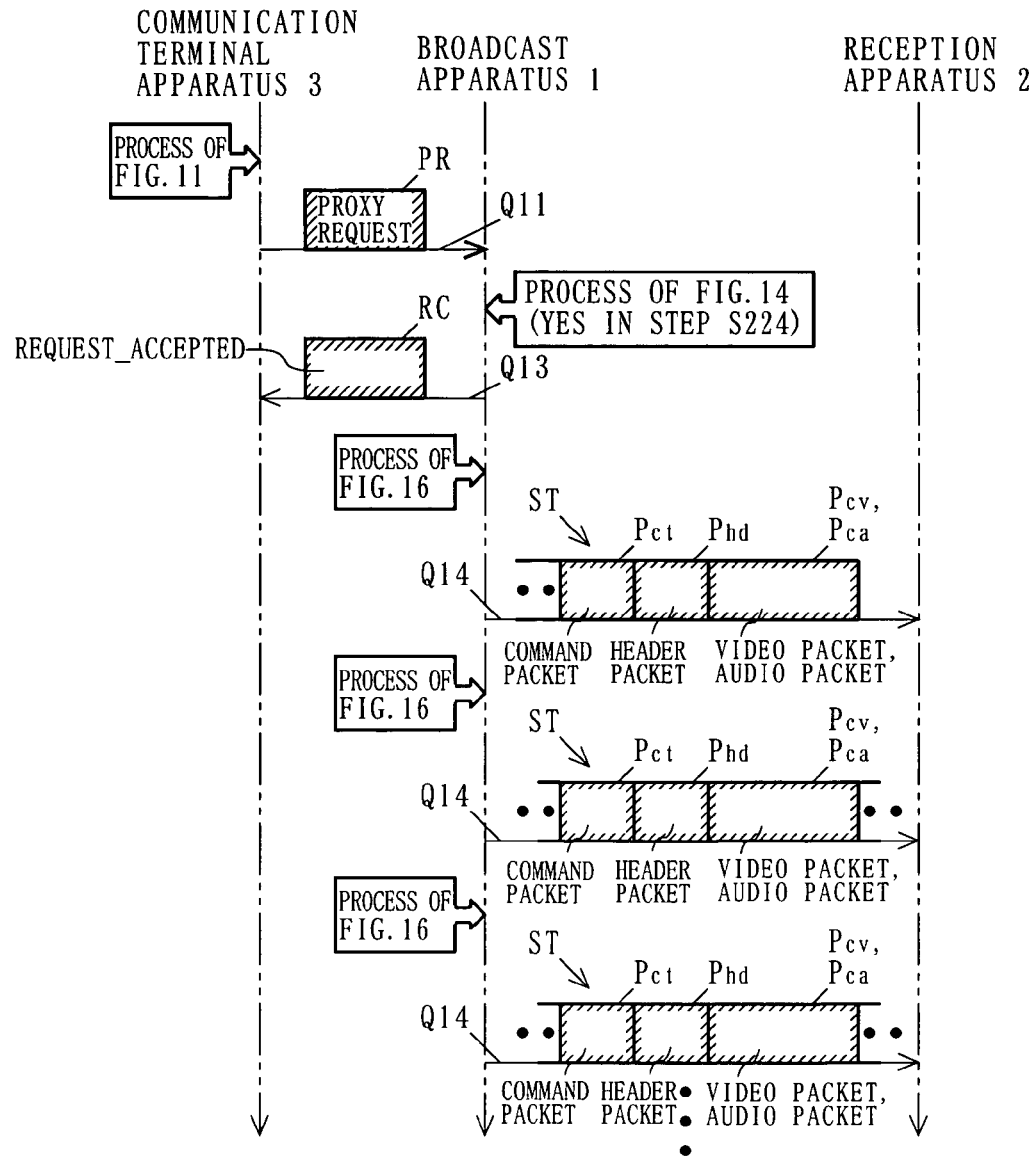

FIG. 10(*a*) and FIG. 10(*b*) are sequence charts illustrating a procedure for data communications performed in the present broadcast system BS. When the user realizes, while away from home, that the user has forgotten to set a scheduled recording for a recording-scheduled broadcast program, the user starts operating the communication terminal apparatus 3. The user operates the input device 31 of the communication terminal apparatus 3 to specify the proxy request program 321. In response to the specification, the application execution section 32 starts executing the proxy request program 321. After the start of the execution, the application execution section 32 generates the proxy request PR according to information inputted by the user, and transmits it to the broadcast apparatus 1 via the communication line 4 (sequence Q11 of FIG. 10(*a*) and FIG. 10(*b*)).

Figure 11:
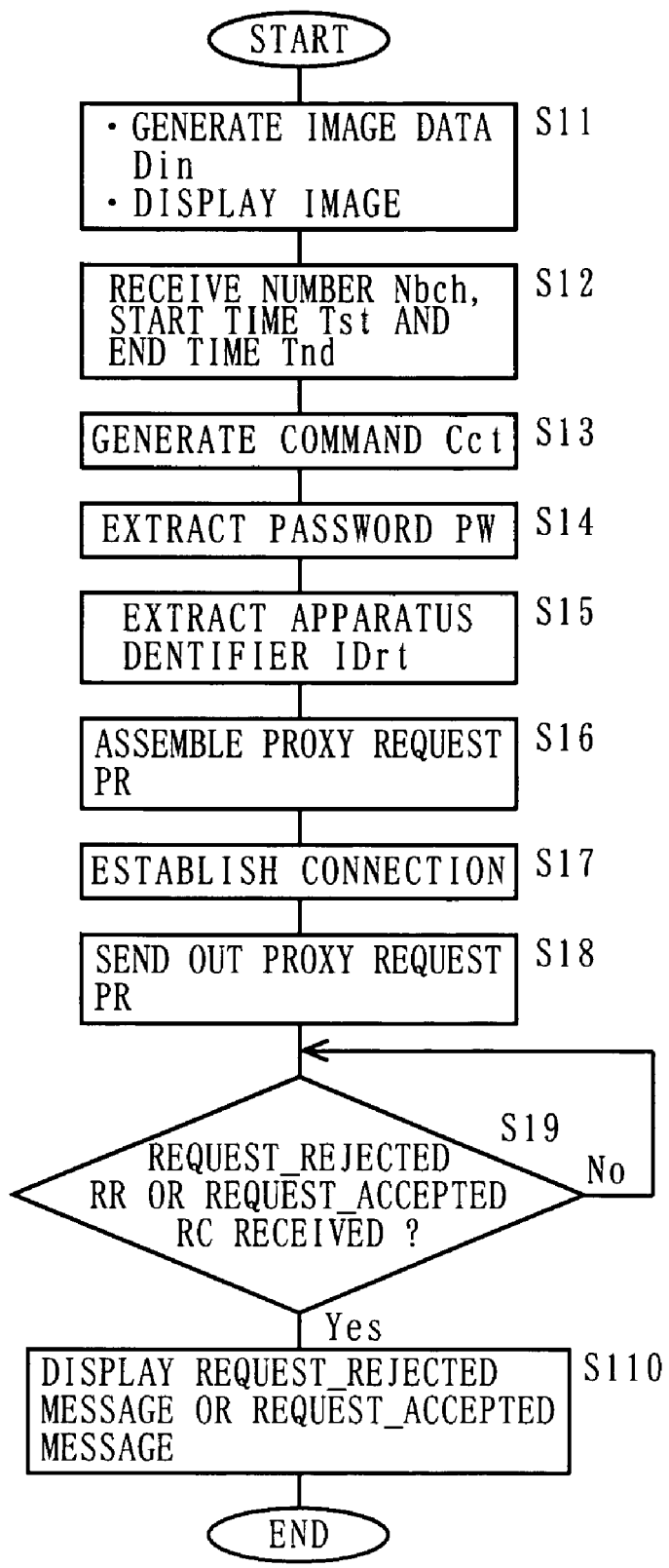
FIG. 11 is a flow chart illustrating the procedure of a process in which an application execution section 32 of FIG. 9 generates and transmits the proxy request PR.

FIG. 11 is a flow chart illustrating the procedure of a process in which the application execution section 32 generates and transmits the proxy request PR. In FIG. 11, the application execution section 32 generates image data on which the user can specify items necessary for setting a scheduled recording, and passes it to the output device 36. According to the received image data, the output device 36 displays an image on which the user can specify items necessary for setting a scheduled recording (step S11 of FIG. 11).

Figure 12:
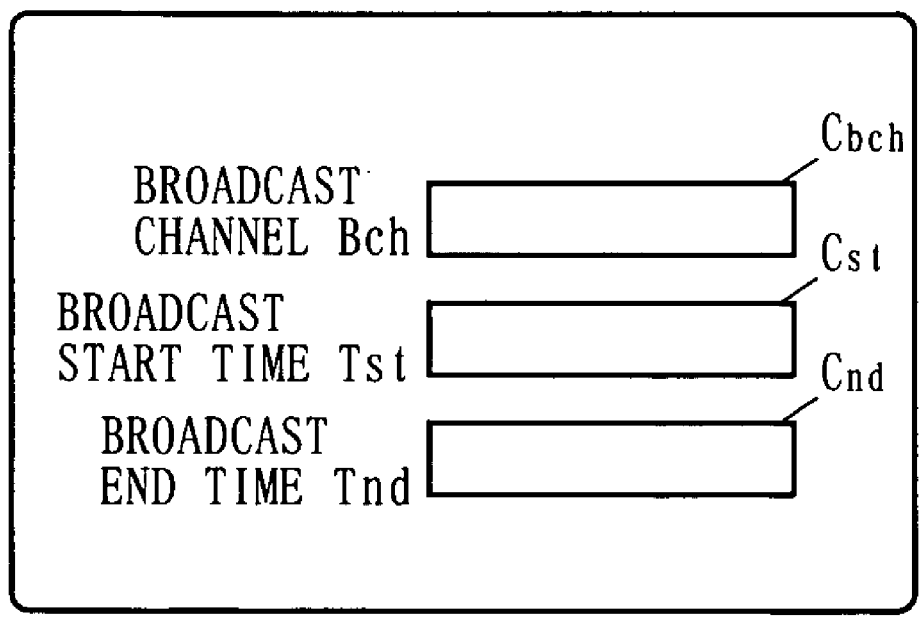
FIG. 12(a) and FIG. 12(b) are schematic diagrams illustrating an example of an image to be displayed in step S11 of FIG. 11.
Figure 12:
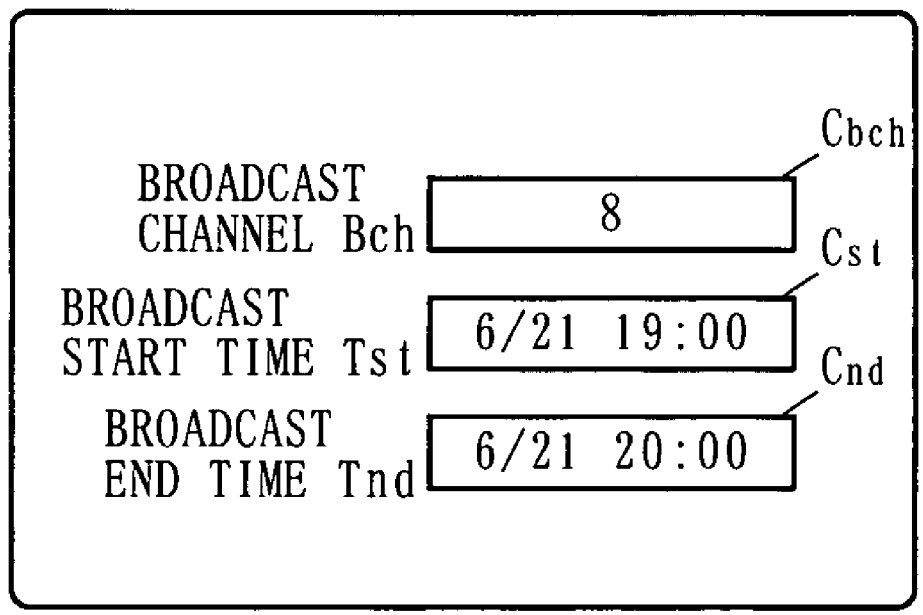

FIG. 12(*a*) is a schematic diagram illustrating an example of an image displayed in step S11. As illustrated in FIG. 12(*a*), an input box Cbch for the broadcast channel BCH over which the recording-scheduled broadcast program is transmitted, an input box Cst for the broadcast start time Tst of the recording-scheduled broadcast program, and an input box Cnd for the broadcast end time Tnd of the recording-scheduled broadcast program are displayed on the screen of the output device 36 as input boxes for items necessary for setting a scheduled recording. The user operates the input device 31 to input the broadcast channel BCH, the broadcast start time Tst and the broadcast end time Tnd in the input boxes Cbch, Cst and Cnd, respectively, displayed on the output device 36. It should be noted that the broadcast system BS actually accommodates a plurality of broadcast apparatuses 1. Therefore, what is set in the input box Cbch may not only be the broadcast channel BCH of the broadcast apparatus 1 illustrated in FIG. 1, but may also be the broadcast channel BCH of another broadcast apparatus 1 (not shown). Moreover, the broadcast start time Tst includes not only the time of start of the recording-scheduled broadcast program but also the month and date thereof. This is also true for the broadcast end time Tnd. Moreover, FIG. 12(*b*) is a schematic diagram illustrating an example of the broadcast channel BCH, the broadcast start time Tst and the broadcast end time Tnd to be inputted in the input boxes Cbch, Cst and Cnd, respectively, illustrated in FIG. 12(*a*). In FIG. 12(*b*), "8", "19:00 June 21" and "20:00 June 21" are inputted in the input box Cbch, the input box Cst and the input box Cnd, respectively.

The application execution section 32 receives the broadcast channel BCH, the broadcast start time Tst and the broadcast end time Tnd inputted by the user (step S12), and then generates the command Cct using the received information (step S13). Step S13 will now be described in greater detail. FIG. 13(*a*) is a schematic diagram illustrating a data format of the command Cct that is provided in advance in the application execution section 32. In FIG. 13(*a*), the command Cct includes the scheduled recording command Crec and three fields in which the broadcast channel BCH, the broadcast start time Tst and the broadcast end time Tnd are set. In step S13, the application execution section 32 sets the broadcast channel BCH, the broadcast start time Tst and the broadcast end time Tnd received in step S12 in the three fields to generate the command Cct. FIG. 13(*b*) is a schematic diagram illustrating an example of the broadcast channel BCH, the broadcast start time Tst and the broadcast end time Tnd set in the three fields illustrated in FIG. 13(*a*). If information as illustrated in FIG. 12(*b*) is inputted, "8", "19:00 June 21" and "20:00 June 21" are set in the three fields of the command Cct as illustrated in FIG. 13(*b*).

After generating the command Cct as described above, the application execution section 32 extracts the password PW and the apparatus identifier IDrt from the password storage section 34 and the apparatus identifier storage section 33 in this order (steps S14 to S15). Then, the application execution section 32 adds the extracted password PW and the extracted apparatus identifier IDrt to the command Cct generated in step S13 to assemble the proxy request PR (see FIG. 2(*a*)) (step S16). Note that, if the command Cct illustrated in FIG. 13(*b*) is generated, the proxy request PR illustrated in FIG. 2(*b*) is generated.

After the proxy request PR is generated, the application execution section 32 controls the wireless transmission/ reception section 35 to establish a connection with the broadcast apparatus 1 (step S17). Note that the establishment of the connection is not limited to after step S16 but may alternatively be before step S16. After the connection is established, the application execution section 32 sends out the generated proxy request PR to the communication line 4 via the wireless transmission/reception section 35 (step S18). The proxy request PR sent out as described above is transmitted to the broadcast apparatus 1 via the communication line 4 of FIG. 1 as illustrated in FIG. 10(a) and FIG. 10(b).

Figure 14:
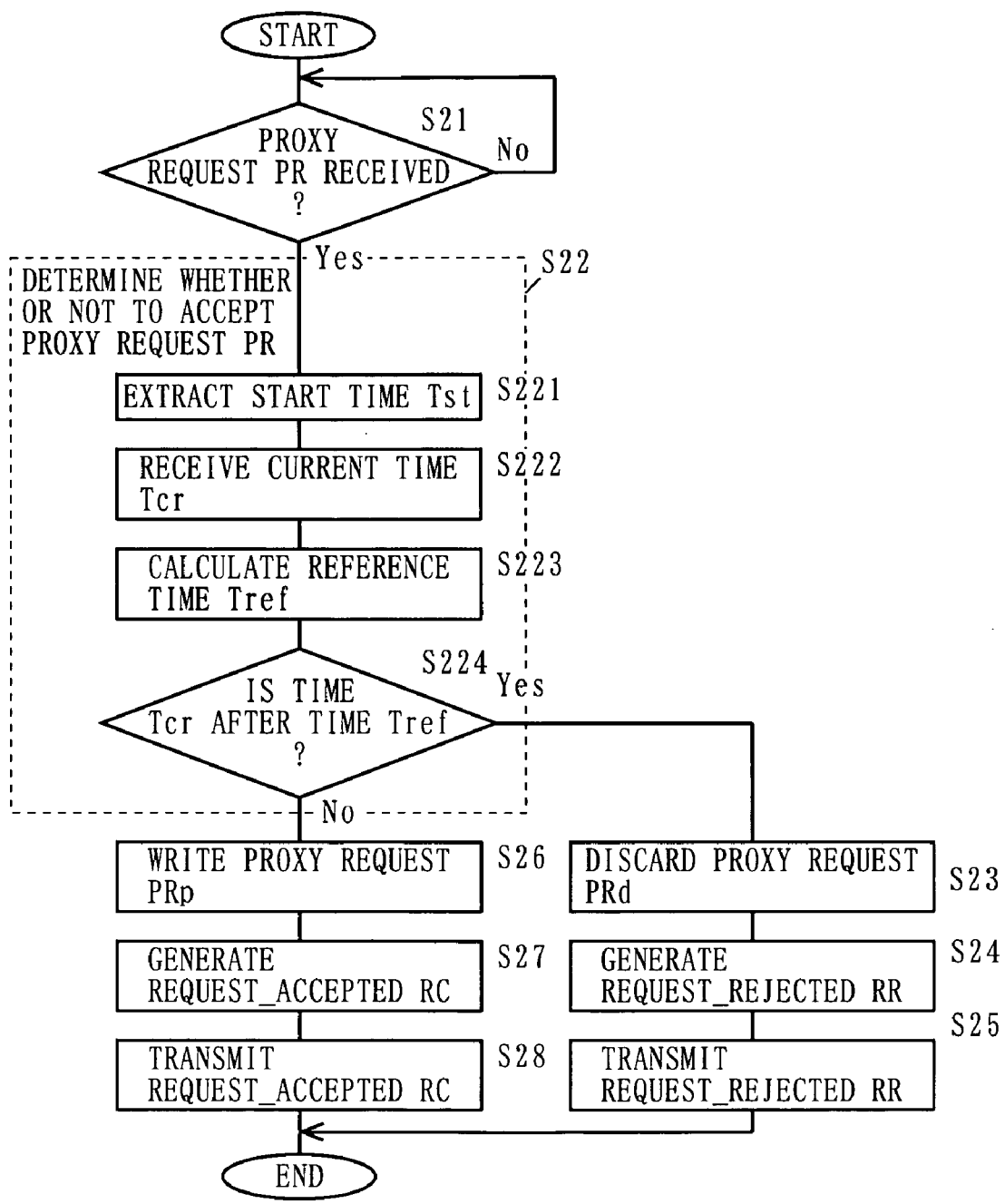
FIG. 14 is a flow chart illustrating the procedure of a process performed when the broadcast apparatus 1 of FIG. 1 receives the proxy request PR.

FIG. 14 is a flow chart illustrating the procedure of a process performed when the broadcast apparatus 1 receives the proxy request PR. In FIG. 14, the request reception section 11 of the broadcast apparatus 1 waits for the proxy request PR to arrive (step S21), and passes the received proxy request PR to the request determination section 13. The request determination section 13 determines whether or not to accept the received proxy request PR (step S22). As described above, a proxy request PR including a command Cct such that it is no use transmitting the proxy request PR to the reception apparatus 2 may arrive at the broadcast apparatus 1. A typical example of such a useless command Cct will now be described. The broadcast start time Tst set in the command Cct is the time at which the scheduled recording needs to be started. Therefore, the command Cct needs to arrive at the reception apparatus 2 by the broadcast start time Tst at the latest. Where Ttf1 is the amount of time from when the command packet Pct including the command Cct is sent out from the broadcast apparatus 1 to when it arrives at the reception apparatus 2, Ttf1 can be approximated as follows.

$$Ttf1 \approx (Nmux \cdot Sct + Shd)/BWct \quad (1)$$

Nmux and BWct are as described above. Sct is the data size of the command packet Pct. Shd is the data size of the packet header Phd. Nmux, Sct, Shd and BWct are known values, and are assumed to be constants in the present embodiment for the purpose of illustration.

Moreover, as will be described later, one command packet Pct is transmitted a predetermined number Nsc of times at a predetermined time interval Tnv according to DSM-CC. DSM-CC will not be further described in the present embodiment, as it is defined in ISO/IEC13818-6. Moreover, Nsc is a natural number equal to or greater than 2. Thus, it takes time Ttf2, which is approximated in Expression (2) below, from when the command packet Pct transmitted in the first transmission arrives at the reception apparatus 2 to when the command packet Pct transmitted in the $Nsc^{th}$ transmission arrives at the reception apparatus 2.

$$Ttf2 \approx Tnv \cdot (Nsc-1) \quad (2)$$

Thus, the proxy request PR needs to arrive at the broadcast apparatus 1 by the reference time Tref, which is calculated by Expression (3) below.

$$Tref = Tst - (Nsc \cdot Ttf1 + Ttf2) - Tmg \quad (3)$$

Tmg is a predetermined time margin that is determined according to the design requirements of the broadcast system BS.

If the proxy request PR arrives at the broadcast apparatus 1 after the reference time Tref described above, the broadcast apparatus 1 cannot send out the command Cct a number Nsc of times at the time interval Tnv by the broadcast start time Tst. Therefore, the proxy request PR failing to meet this condition is regarded as including a useless command Cct.

In order to determine whether or not the received proxy request PR includes a useless command Cct as described above, the request determination section 13 first extracts the broadcast start time Tst from the proxy request PR received from the request reception section 11 (step S221). Furthermore, the request determination section 13 receives the current time Tcr from the timer 13 (step S222). Then, the request determination section 13 substitutes the broadcast start time Tst obtained in step S221 into Expression (3) above to calculate the reference time Tref (step S223). Then, the request determination section 13 determines whether or not the current time Tcr obtained in step S222 is after the reference time Tref calculated in step S223 (step S224). If it is determined "Yes", the request determination section 13 regards the received proxy request PR as including a useless command Cct, and passes the proxy request PR to the request discarding section 14 as the proxy request PRd. The request discarding section 14 discards the received proxy request PRd (step S23), and then gives the request_rejected generation section 15 the instruction ISrr to generate the request_rejected signal RR. In response to the instruction ISrr from the request discarding section 14, the request_rejected generation section 15 generates the request_rejected signal RR as described above (step S24). The request_rejected generation section 15 passes the generated request_rejected signal RR to the request_rejected transmission section 16. The request_rejected transmission section 16 transmits the received request_rejected signal RR to the communication terminal apparatus 3, with which a connection has been established via the communication line 4 (step S25, sequence Q13 of FIG. 10(a)).

In the communication terminal apparatus 3, the wireless transmission/reception section 35 receives the request_rejected signal RR and passes it to the application execution section 32. After step S18 as described above, the application execution section 32 waits for the request_rejected signal RR or the request_accepted signal RC to be sent from the broadcast apparatus 1 (step S19), and if the request_rejected signal RR is received as in the current case, the application execution section 32 displays a message that the proxy request PR cannot be accepted on the output device 36 (step S110). Thus, the user of the communication terminal apparatus 3 knows that the proxy request PR sent by the user has not been accepted by the broadcast apparatus 1.

Figure 15:
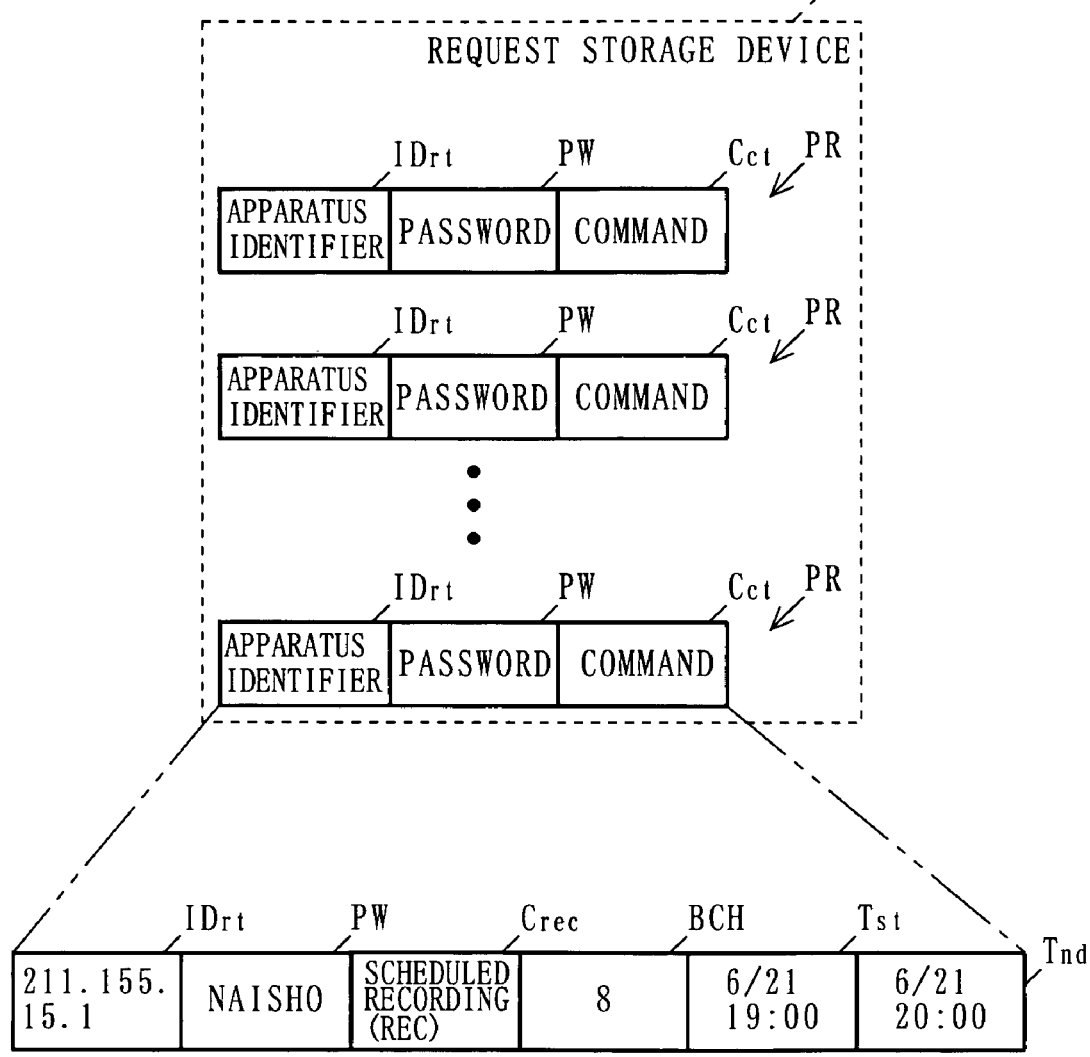
FIG. 15 is a schematic diagram illustrating an example of a proxy request PRp stored in a request storage device 18 of FIG. 3.

Reference is made again to FIG. 14. If it is determined "No" in step S224, the request determination section 13 regards the received proxy request PR as not including a useless command Cct, and passes it to the request writing section 17 as the proxy request PRp. The request writing section 17 writes the received proxy request PRp to the request storage device 18 (step S26). As a result, a new proxy request PRp is stored in the request storage device 18, as illustrated in FIG. 15. Note that while the present embodiment has been described assuming that the broadcast system BS accommodates one communication terminal apparatus 3 and one reception apparatus 2, the broadcast system BS actually accommodates a number of communication terminal apparatuses 3 and reception apparatuses 2. Furthermore, the same communication terminal apparatus 3 may transmit a plurality of proxy requests PR to the broadcast apparatus 1. Thus, in most cases, a plurality of proxy requests PRp are stored in the request storage device 18, as illustrated in FIG. 15. Note that if the request writing section 17 receives the proxy request PR illustrated in FIG. 2(b), it is stored as the proxy request PRp as illustrated at the bottom of FIG. 15.

The request writing section 17 further gives the request_accepted generation section 19 the instruction ISrc to generate the request_accepted signal RC. In response to the instruction ISrc from the request writing section 17, the request_accepted generation section 19 generates the request_accepted signal RC as described above (step S27). The request_accepted generation section 19 passes the generated request_accepted signal RC to the request_accepted transmission section 110. The request_accepted transmission section 110 transmits the received request_accepted signal RC to the communication terminal apparatus 3, with which a connection has been established via the communication line 4 (step S28, sequence Q13 of FIG. 10(b)).

In the communication terminal apparatus 3, the wireless transmission/reception section 35 passes the received request_accepted signal RC to the application execution section 32. After step S18, the application execution section 32 waits for the request_rejected signal RR or the request_accepted signal RC as described above (step S19), and if the request_accepted signal RC is received as in the current case, the application execution section 32 notifies the reception of the request_accepted signal RC on the output device 36 (step S110). Thus, the user of the communication terminal apparatus 3 knows that the current proxy request PR has been accepted by the broadcast apparatus 1.

Figure 16:
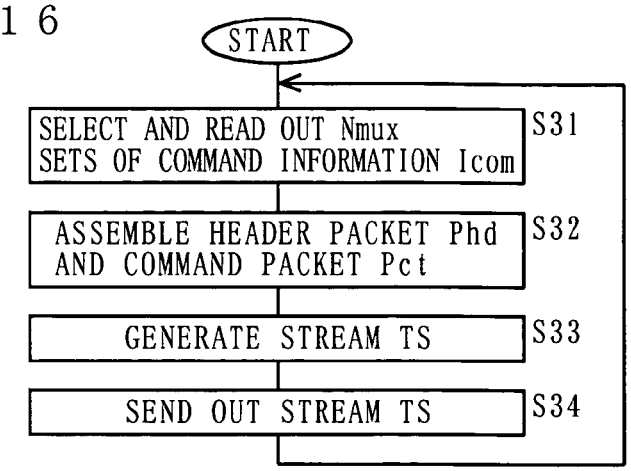
FIG. 16 is a flow chart illustrating the procedure of a process that the broadcast apparatus 1 of FIG. 1 performs when transmitting the transport stream TS.

FIG. 16 is a flow chart illustrating the procedure of a process that the broadcast apparatus 1 performs when transmitting the proxy request PRp stored in the request storage device 18. As described above, the command extraction section 111 periodically selects and reads out a number Nmux of information sets Icom (proxy requests PRp) from the request storage device 18 (step S31). Note that after the completion of the readout operation described above, the command extraction section 111 passes the information sets Icom to the command packet assembler 112. Furthermore, it is assumed that the command extraction section 111 has read out the proxy request PR illustrated in FIG. 2(b) as the information set Icom.

The command packet assembler 112 assembles a header packet Phd, and also assembles a command packet Pct from the received information set Icom (step S32). Therefore, Nmux command packets Pct are assembled. Furthermore, the command packet assembler 112 first outputs the header packet Phd to the multiplexer 118, and then sequentially outputs Nmux command packets Pct to the multiplexer 118, as illustrated in FIG. 4(a) and FIG. 4(b).

As described above, at the broadcast start time of a program, the video data Dv and the audio data Da of the program to be broadcast are read out from the broadcast program storage device 113 and are outputted to the video encoder 114 and the audio encoder 116, respectively. The video encoder 114 and the audio encoder 116 encode the received video data Dv and the received audio data Da to output the encoded video data Dcv and the encoded audio data Dca to the video packet assembler 115 and the audio packet assembler 117, respectively. The video packet assembler 115 and the audio packet assembler 117 assemble a number of video packets Pcv and audio packets Pca from the received encoded video data Dcv and the received encoded audio data Dca, respectively, and output them to the multiplexer 118.

The multiplexer 118 generates the stream TS illustrated in FIG. 5(a) and FIG. 5(b) by multiplexing together the received video packet Pcv, the received audio packet Pca, the received header packet Phd and Nmux received command packets Pct (step S33), and outputs it to the TS transmitter 119. The TS transmitter 119 sends out the received stream TS to the broadcast channel BCH described above on a carrier wave having a predetermined broadcast frequency band (step S34, sequence Q14 of FIG. 10(b)).

Figure 17:
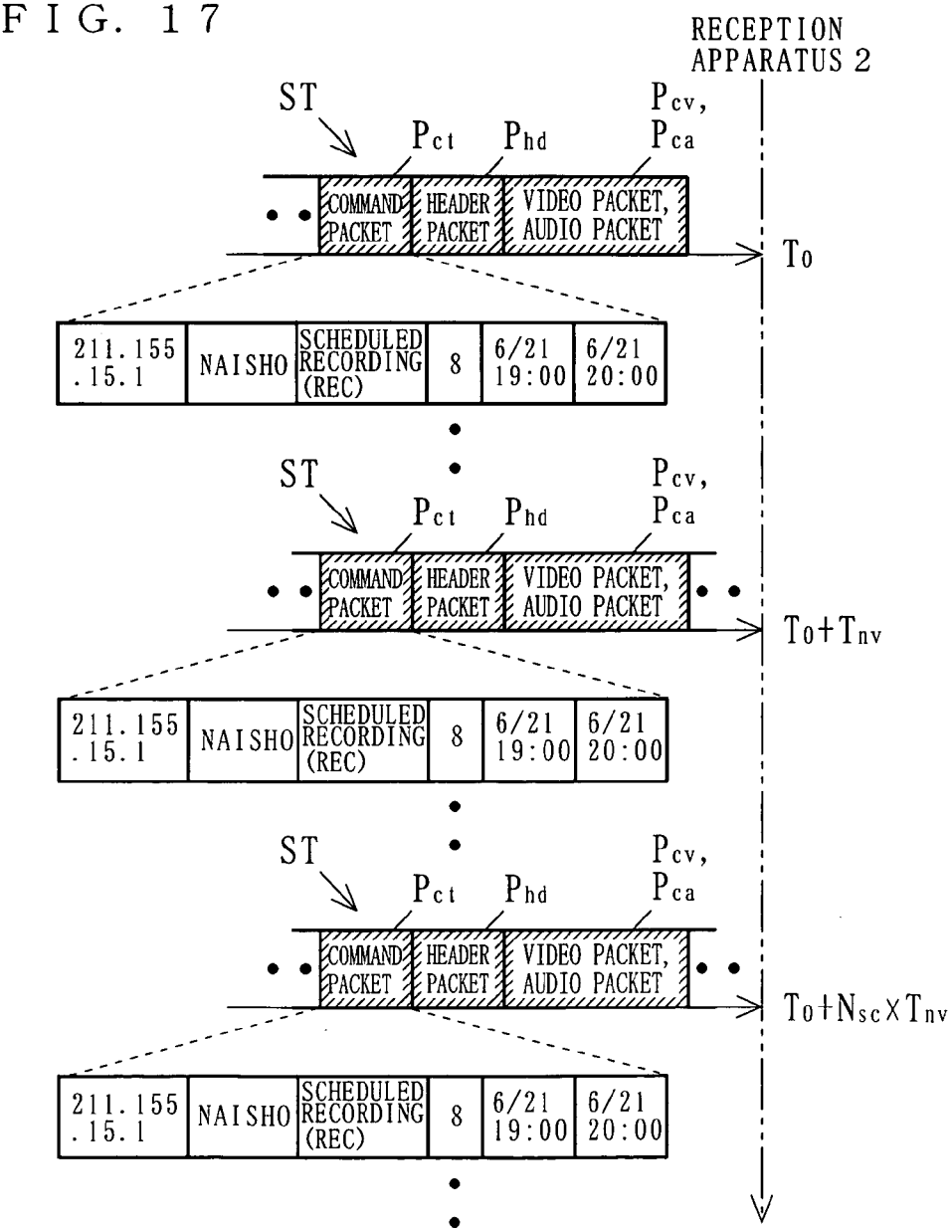
FIG. 17 is a schematic diagram illustrating the command packet Pct of the same contents arriving at the reception apparatus 2 of FIG. 1 Nsc times at a time interval Tnv.

In the broadcast apparatus 1, the process of FIG. 16 is repeated, whereby the set of a header packet Phd and Nmux command packets Pct (only one is shown in the figure) is periodically sent out to the broadcast channel BCH as illustrated in FIG. 10(b). It should be noted that since the command extraction section 111 performs the process according to DSM-CC, one proxy request PRp is read out Nsc times at the time interval Tnv. As a result, if the reception apparatus 2 receives the first command packet Pct (see FIG. 4(b)) at time T0, the reception apparatus 2 receives the second command packet Pct at time T0+Tnv, and finally receives the $Nsc^{th}$ command packet Pct at time T0+Nsc·Tnv, as illustrated in FIG. 17.

Next, referring to the flow chart of FIG. 18, the process performed by the reception apparatus 2 when receiving the command packet Pct sent out from the broadcast apparatus 1 will be described. The user, when going out, operates a switch (not shown) of the reception apparatus 2 to set the power supply 21 on standby. As a result, the power supply monitoring device 23 sends out the control signal CSfa to the tuner 24 (step S41). In response to the received control signal CSfa, the tuner 24 sets the receiving frequency band thereof to the specified broadcast channel BCHr stored in the specified channel storage section 22 (step S42). Thus, the tuner 24 receives the stream TS from the broadcast apparatus 1 managed by the broadcaster contracted by the user for a proxy service, and does not receive streams TS from other broadcast apparatuses (not shown).

When the user realizes, while away from home, that the user has forgotten to set a scheduled recording for a broadcast program, the user operates the input device 31 of the communication terminal apparatus 3 to execute the proxy request program 321. As a result, the communication terminal apparatus 3 performs the process illustrated in FIG. 11, thereby transmitting the proxy request PR to the broadcast apparatus 1. In response to the received proxy request PR, the broadcast apparatus 1 performs the process of FIG. 14. If it is determined "No" in step S224, the command packet Pct assembled from the current proxy request PR is sent out to the broadcast channel BCH while being multiplexed in the stream TS. It is assumed that the command packet Pct generated from the proxy request PR illustrated in FIG. 2(b) is sent out in the sent-out stream TS. Since the receiving frequency band of the tuner 24 is set to the specified broadcast channel BCHr, the tuner 24 receives the stream TS sent out from the broadcast apparatus 1 (step S43), and outputs it to the command packet separation section 25. Note that although the tuner 24 outputs the received stream TS also to the AV packet separation section 217, the AV packet separation section 217 does not perform any operation on the stream TS because the driving voltage Ecc is not supplied to the AV packet separation section 217 while the power supply 21 is on standby.

The command packet separation section 25 separates each command packet Pct multiplexed in the received stream TS while referring to the header packet Phd (step S44), and outputs the separated command packet Pct to the command packet disassembling section 26. The command packet disassembling section 26 disassembles the received command packet Pct to restore the information set Icom (step S45). Furthermore, the command packet disassembling section 26 passes the restored information set Icom to the command filtering section 29.

Each time the command filtering section 29 receives one information set Icom, the command filtering section 29 extracts the apparatus identifier IDrt and the password PW therefrom (step S46). Furthermore, the command filtering section 29 extracts the local apparatus identifier IDrt and the local password PW as described above (step S47). Then, the command filtering section 29 determines whether or not the apparatus identifier IDrt extracted in step S46 matches the local apparatus identifier IDrt extracted in step S47 (step S48). Furthermore, the command filtering section 29 determines whether or not the password PW extracted in step S46 matches the local password PW extracted in step S47 (step S49). If it is determined "No" in step S48, the command filtering section 29 determines that the received information set Icom is not destined for the present reception apparatus, and discards the received information set Icom (step S410). If it is determined "No" in step S49, it means that the password PW determined by the user is not set in the current information set Icom, whereby the command filtering section 29 discards the information set Icom in step S410. In contrast, if it is determined "YES" in both steps S48 and S49, the command filtering section 29 determines that the received information set Icom is destined for the present reception apparatus and that it includes the command Cct intended by the user, whereby the command filtering section 29 extracts the command Cct and passes it to the determination/writing section 210.

Each time the determination/writing section 210 receives one command Cct, the determination/writing section 210 performs the schedule overlap determination process described above (step S411) and further performs the capacity determination process described above (step S412). If it is determined "YES" in step S411, the determination/writing section 210 determines that a command Cct having a scheduled time period TPrp that overlaps that of the received command Cct is stored in the command storage section 211. Furthermore, if it is determined "YES" in step S412, the determination/writing section 210 determines that the scheduled program storage device 218 does not have a sufficient free space FS. If either one of these two decisions is made, the determination/writing section 210 discards the received command Cct, and gives the error message generation section 213 the instruction ISem as described above (step S413).

In response to the instruction ISem, the error message generation section 213 generates the error message EM as illustrated in FIG. 8 (step S414). Moreover, the line connection section 214 sends out the error message EM generated by the error message generation section 213 to the communication line 4 (step S415). Since the error message EM is in the form of electronic mail as described above, it is stored in a mail server (not shown) connected to the communication line 4.

Figure 19:
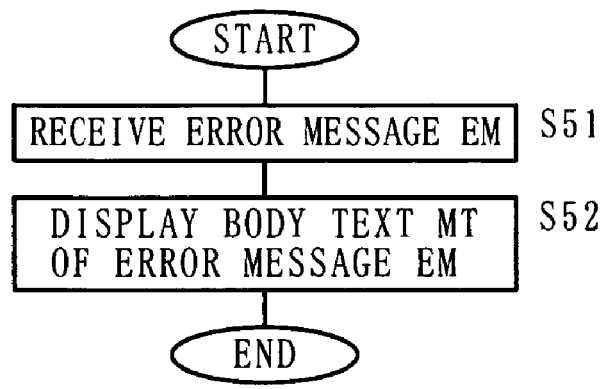
FIG. 19 is a flow chart illustrating the procedure of a process that the communication terminal apparatus 3 of FIG. 1 performs when receiving the error message EM.

FIG. 19 is a flow chart illustrating the procedure of a process that the communication terminal apparatus 3 performs when receiving the error message EM. The user operates the input device 31 of the communication terminal apparatus 3 to instruct to start the execution of the email client program 322. Furthermore, the user instructs to obtain the error message EM from the mail server described above. In FIG. 19, in response to the instruction from the user, the application execution section 32 receives the error message EM stored in the mail server via the communication line 4 and the wireless transmission/reception section 35 (step S51). The application execution section 32 displays the body text MT of the received error message EM on the output device 36 (step S52). Thus, the user of the communication terminal apparatus 3 knows that the scheduled recording cannot be set.

Figure 18:
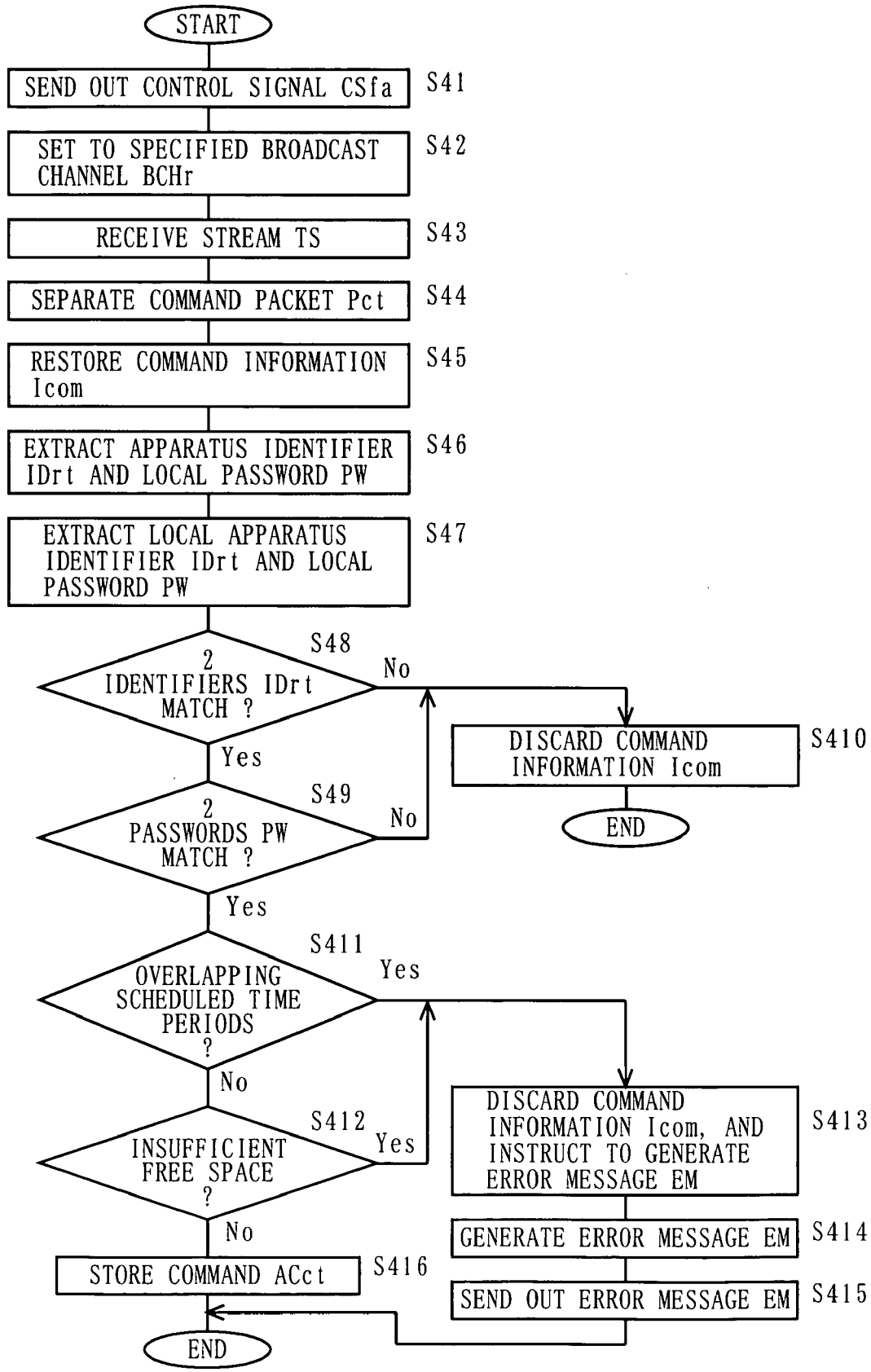
FIG. 18 is a flow chart illustrating the procedure of a process that the reception apparatus 2 of FIG. 1 performs when receiving the transport stream TS.
Figure 20:
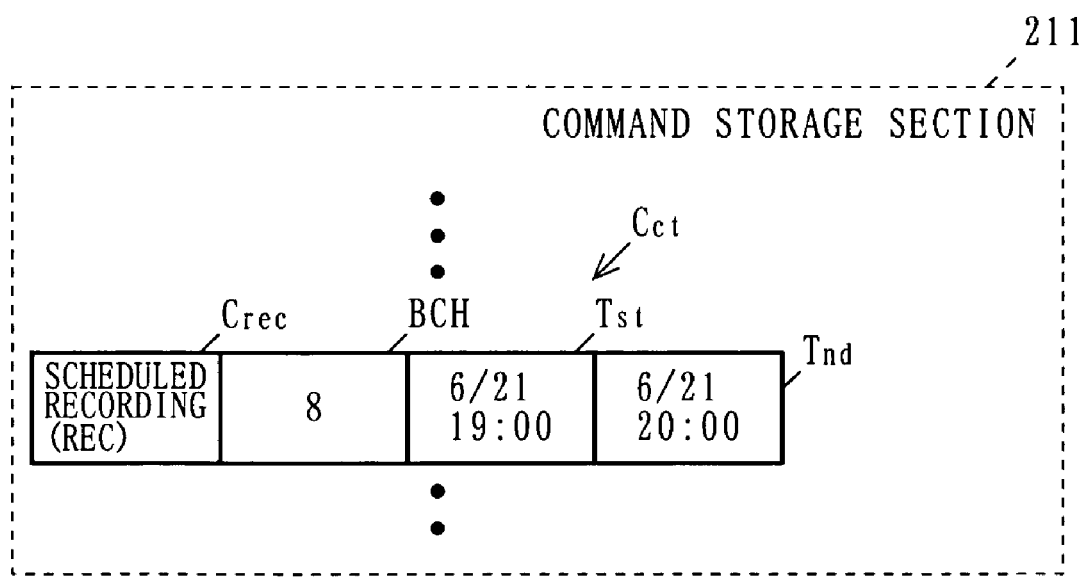
FIG. 20 is a schematic diagram illustrating an example of a command ACct that is written to the command storage section 211 by performing step S416 of FIG. 18.

If it is determined "No" in both steps S411 and S412 of FIG. 18, the determination/writing section 210 gives a write permission for the received command Cct, and writes the received command Cct in the command storage section 211 as the command ACct (step S416). FIG. 20 is a schematic diagram illustrating an example of the command ACct written in step S416. In FIG. 20, if a write permission is given for the command Cct included in the proxy request PR illustrated in FIG. 2(b), a command ACct as illustrated in the figure is stored in the command storage section 211.

Figure 21:
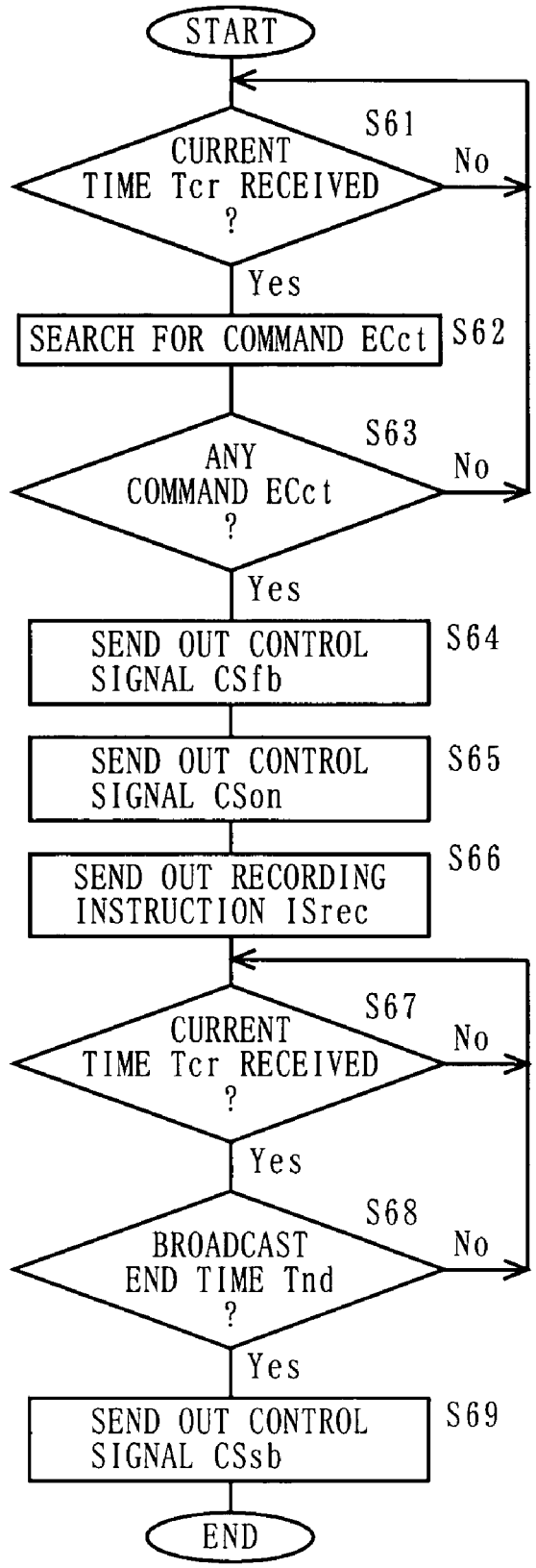
FIG. 21 is a flow chart illustrating the procedure of a process that a command execution section 216 of FIG. 6 performs when executing the command ACct stored in the command storage section 211.

Next, referring to the flow chart of FIG. 21, the process in which the command execution section 216 executes the command ACct stored in the command storage section 211 will be described. In FIG. 21, the command execution section 216 waits for the current time Tcr periodically sent from the timer 215 (step S61). Each time the current time Tcr is received, the command execution section 216 searches for a command ECct whose broadcast start time Tst matches the received current time Tcr from among all the commands ACct stored in the command storage section 211 (see FIG. 20) (step S62). If a command ECct is not found (step S63), the command execution section 216 returns to step S61 to wait for the current time Tcr sent from the timer 215. In contrast, if a command ECct is found in step S63, the command execution section 216 generates the control signal CSfb as described above and outputs it to the tuner 24 (step S64), generates the control signal CSon as described above and outputs it to the power supply 21 (step S65), and outputs the recording instruction ISrec as described above to the AV packet separation section 217 (step S66), in order to start the scheduled recording. As a result of step S64, the tuner 24 sets the receiving frequency band thereof to the broadcast channel BCH specified by the received control signal CSfb. As a result of step S65, the power supply 21 supplies the driving voltage Ecc to the AV packet separation section 217. As a result of step S66, the AV packet separation section 217 operates as instructed by the recording instruction ISrec. If the scheduled recording is started as described above, the scheduled program storage device 218 starts storing the video packet Pcv and the audio packet Pca separated by the AV packet separation section 217.

Moreover, after step S66, the command execution section 216 waits for the current time Tcr (step S67). Each time the current time Tcr is received, it is determined whether or not the broadcast end time Tnd set in the current command ECct matches the received current time Tcr (step S68). If Tnd and Tcr do not match, the command execution section 216 returns to step S67 to wait for the current time Tcr sent from the timer 215. In contrast, if Tnd and Tcr match, the command execution section 216 generates the control signal CSsb as described above and outputs it to the power supply 21 (step S69) in order to terminate the scheduled recording. As a result of step S69, the power supply 21 transitions to standby, and stops supplying the driving voltage Ecc to the AV packet separation section 217. If the power supply 21 transitions to standby, the power supply monitoring device 23 generates the control signal CSfa as described above and outputs it to the tuner 24.

As described above, with the broadcast system BS of the present embodiment, the broadcast apparatus 1 multiplexes the command packet Pct assembled from the accepted proxy request PRp in a transport stream TS a plurality of times, as illustrated in FIG. 17. Therefore, it is possible to realize the broadcast system BS in which the reception apparatus 2 can receive those commands Cct that are destined for itself with a high probability. Moreover, as described above, the command packet Pct assembled from the command Cct is transmitted from the broadcast apparatus 1 primarily when the user is away from home (i.e., if the power supply 21 is on standby). The receiving frequency band of the reception apparatus 2 is automatically set to the specified broadcast channel BCHr stored in the specified channel storage section 22 if the power supply 21 is set on standby. Thus, the reception apparatus 2 can receive those commands Cct that are destined for itself with an even higher probability. Moreover, as described above, the command filtering section 29 performs a filtering process using the local apparatus identifier IDrt, whereby it is possible to accurately choose those information sets Icom that are destined for itself from among a large number of information sets Icom received.

Moreover, the broadcast apparatus 1 discards a proxy request PR arriving after the reference time Tref through steps S224 and S23 of FIG. 14, while accepting a proxy request PR arriving at or before the reference time Tref through steps S224 and S26. As a result, the transmission of the command Cct included in the proxy request PRp stored in the request storage device 18 is not hindered by the command Cct included in a useless proxy request PR, whereby the reception apparatus 2 can receive the command Cct by the broadcast start time Tst with a higher probability.

Note that in the broadcast system BS as described above, the broadcast apparatus 1 sends out the command packet Pct of the same contents a number Nsc of times. This is done in order to increase the probability that the reception apparatus 2 properly receives the command packet Pct. However, if the probability that a command packet Pct can be received is sufficiently high, the broadcast apparatus 1 may alternatively transmit the command packet Pct only once.

Moreover, in the broadcast system BS as described above, the broadcast apparatus 1 and the reception apparatus 2 may be connected to each other by a wire transmission path such as a cable. Moreover, the reception apparatus 2 may receive the stream TS generated by the broadcast apparatus 1 via a broadcast satellite or a communications satellite. Moreover, in the broadcast system BS as described above, the broadcast scheme of the broadcast apparatus 1 is digital, but it may alternatively be analog. Moreover, the reception apparatus 2 transmits the error message EM to the communication terminal apparatus 3 in the form of electronic mail, the error message EM may alternatively be transmitted in other forms of data communications. Furthermore, the reception apparatus 2 may alternatively transmit the error message EM to the broadcast apparatus 1. Thus, the broadcast apparatus 1 can recognize that the command packet Pct that it sent out to the reception apparatus 2 has not been stored in the command storage section 211 as the command Cct.

Moreover, in the broadcast system BS as described above, as the communication terminal apparatus 3 transmits one proxy request PR to the broadcast apparatus 1, the broadcast apparatus 1 sends out command packets Pct of the same contents. However, the present invention is not limited to this, and the broadcast apparatus 1 may alternatively send out command packets Pct of different contents in response to one proxy request PR. When a broadcaster produces a program, it is usually not broadcast at once from the beginning to end of the entire story. Rather, a broadcaster usually produces a program in which the entire story is divided into 1-hour episodes, for example, and the entire story is completed by separately broadcasting these episodes starting from the first episode and ending with the last episode. Furthermore, the first to last episodes are broadcast in the same time slot and day of week. Such a broadcast schedule is often set in advance. Under such circumstances, the broadcast apparatus 1 may send out command packets Pct of the same contents except for the date or the day of week of the broadcast start time Tst and the broadcast end time Tnd varying from one another so that all the episodes of the specified broadcast program can be scheduled for recording by one proxy request PR. Furthermore, if the broadcast schedule of the broadcast program specified by the proxy request PR is changed afterwards, the broadcast apparatus 1 may send out command packets Pct whose broadcast start time Tst and broadcast end time Tnd are changed accordingly. Thus, the communication terminal apparatus 3 needs to send out the proxy request PR only once, thereby reducing the communication cost.

Figure 22:
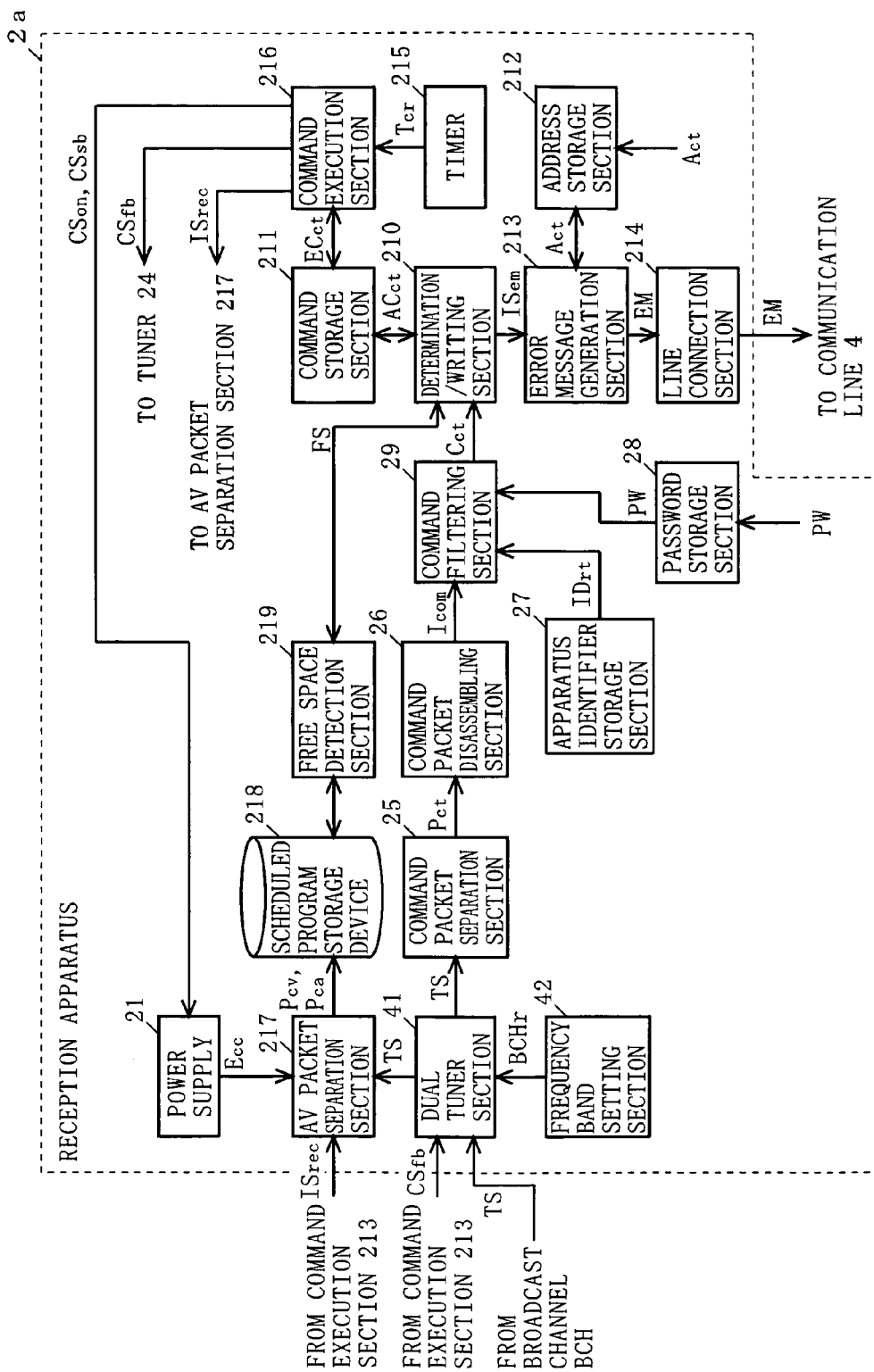
FIG. 22 is a block diagram illustrating a detailed configuration of a first variant (reception apparatus 2a) of the reception apparatus 2 of FIG. 1.

Next, a first variant of the reception apparatus 2 illustrated in FIG. 6 (hereinafter referred to as a "reception apparatus 2a") will be described. FIG. 22 is a block diagram illustrating a detailed configuration of the reception apparatus 2a. In FIG. 22, the reception apparatus 2a, as compared to the reception apparatus 2 of FIG. 6, includes a dual tuner section 41 and a frequency band setting section 42, instead of the specified channel storage section 22, the power supply monitoring device 23 and the tuner 24. Other than this, the reception apparatuses 2a and 2 do not differ from each other in structure. Therefore, in FIG. 22, those components already shown in FIG. 6 will be denoted by the same reference numerals and will not be further described below.

Figure 23:
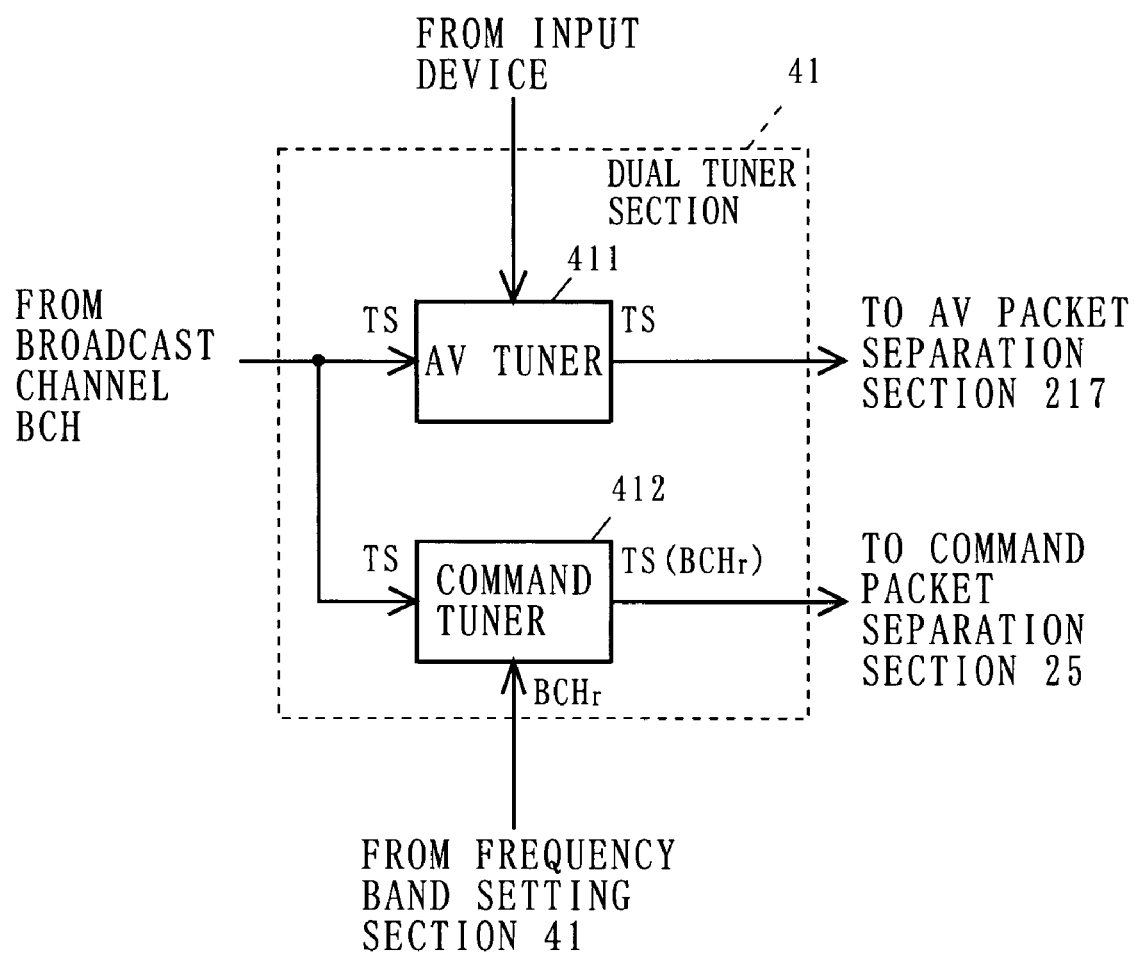
FIG. 23 is a block diagram illustrating a detailed configuration of a dual tuner 41 of FIG. 22.

Moreover, FIG. 23 is a block diagram illustrating a detailed configuration of the dual tuner section 41 of FIG. 22. In FIG. 23, the dual tuner section 41 includes an AV tuner 411 and a command tuner 412. The AV tuner 411 sets the receiving frequency band thereof to the broadcast channel BCH specified by the user by operating an input device (not shown) of the reception apparatus 2a. Then, the AV tuner 411 receives the stream TS transmitted over the set broadcast channel BCH and outputs it to the AV packet separation section 217. Moreover, the command tuner 412 sets the receiving frequency band thereof to the specified broadcast channel BCHr sent from the frequency band setting section 42. Then, the command tuner 412 constantly receives the stream TS transmitted over the specified broadcast channel BCHr and outputs it to the command packet separation section 25.

The frequency band setting section 42 is typically a set of keys or buttons. The user or the broadcaster operates the frequency band setting section 42 to input the specified broadcast channel BCHr. The frequency band setting section 42 sends the inputted specified broadcast channel BCHr to the command tuner 412.

As described above, with the provision of the command tuner 412 dedicated for the specified broadcast channel BCHr, the reception apparatus 2a can constantly receive the command packet Pct destined for itself whether or not the power supply 21 is on standby, thereby further reducing the possibility of failing to receive the command Cct destined for itself.

Figure 24:
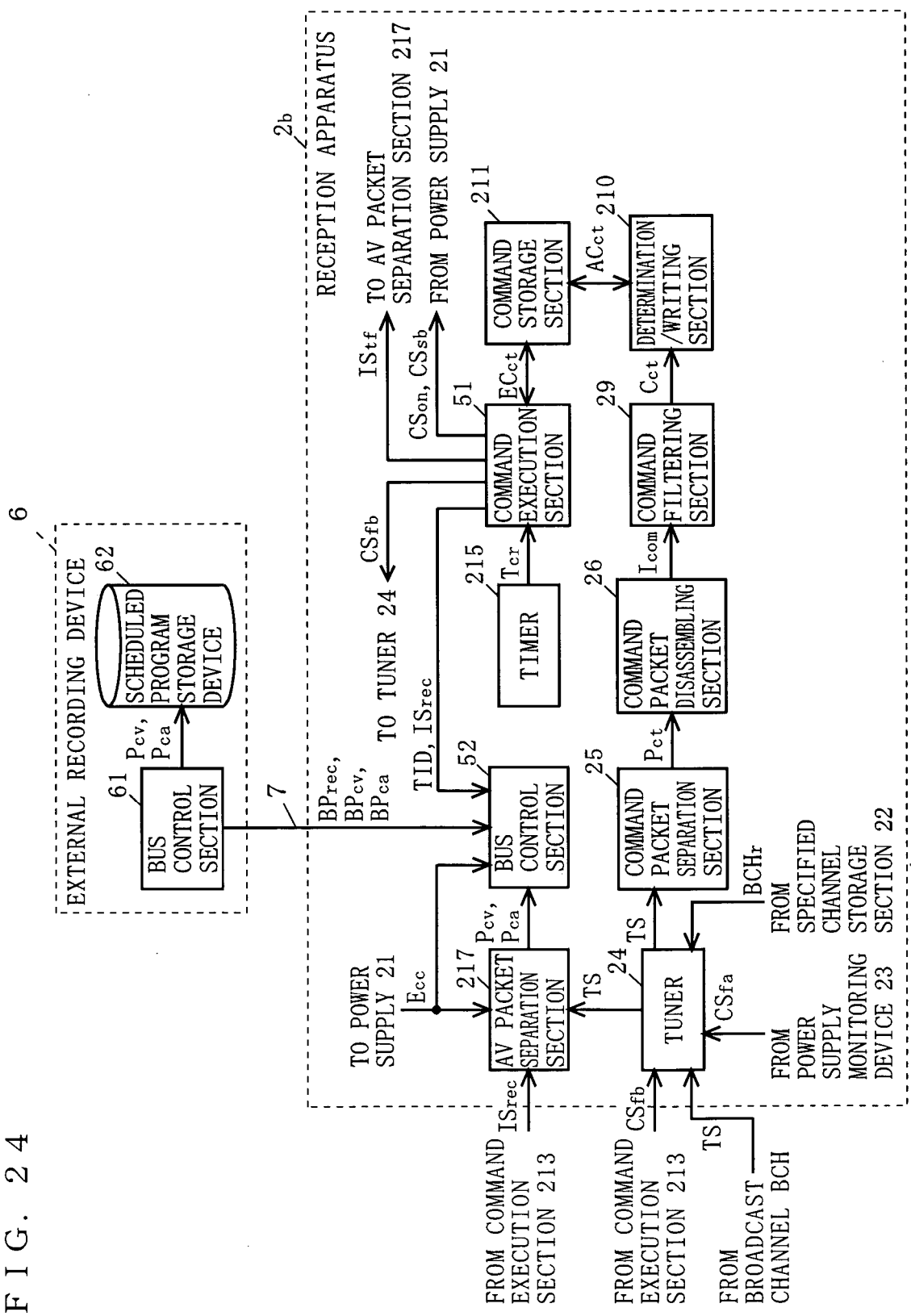
FIG. 24 is a block diagram illustrating a detailed configuration of a second variant (reception apparatus 2b) of the reception apparatus 2 of FIG. 1.

Next, a second variant of the reception apparatus 2 illustrated in FIG. 6 (hereinafter referred to as a "reception apparatus 2b") will be described. FIG. 24 is a block diagram illustrating a detailed configuration of the reception apparatus 2b. In FIG. 24, the reception apparatus 2b, as compared to the reception apparatus 2 of FIG. 6, includes a command execution section 51 and a bus control section 52, instead of the command execution section 216 and the scheduled program storage device 218, and is connected to an external recording device 6 via a bus 7. Other than this, the reception apparatuses 2b and 2 do not differ from each other in structure. Therefore, in FIG. 24, those components already shown in FIG. 6 will be denoted by the same reference numerals and will not be further described below. Note that some of the components shown in FIG. 6 are not shown in FIG. 24 for the sake of simplicity.

The command execution section 51 has two differences as follows from the command execution section 216 described above. First, the command execution section 51 sends out a transfer instruction IStf to the AV packet separation section 217, instead of the recording instruction ISrec described above. The transfer instruction IStf is information for instructing to transfer the video packet Pcv and the audio packet Pca, which have been separated by the AV packet separation section 217, to the bus control section 52. In addition to the operation above, the other difference is that the command execution section 51 sends a target identifier TID pre-assigned to the external recording device 6 for uniquely identifying the external recording device 6 and the recording instruction ISrec to the bus control section 52. Thus, the command execution section 51 instructs to transmit the video packet Pcv and the audio packet Pca outputted from the AV packet separation section 217 to the external recording device 6 via the bus 7.

As with the AV packet separation section 217, the driving voltage Ecc is not supplied to the bus control section 52 if the power supply 21 is on standby, and the driving voltage Ecc is supplied thereto if the power supply 21 is ON. In response to the recording instruction ISrec from the command execution section 51 while the driving voltage Ecc is supplied to the bus control section 52, the bus control section 52 first assembles a bus packet BPrec from the recording instruction ISrec so as to include the target identifier TID, which is received together with the recording instruction ISrec, according to a predetermined bus protocol (e.g., IEEE1394), and sends it out to the bus 7 connected to itself. Then, from the video packet Pcv and the audio packet Pca received subsequently, the bus control section 52 assembles bus packets BPcv and BPca so as to include the target identifier TID, and sends them out to the bus 7 connected to itself.

Moreover, the external recording device 6 is typically a hard disk recorder, a DVD (Digital Versatile Drive) recorder, or a VTR (Video Tape Recorder). The external recording device 6 has the target identifier TID as described above, and includes a bus control section 61 and a scheduled program storage device 62. The bus control section 61 executes the recording command ISrec after disassembling the bus packet BPrec received via the bus 7. More specifically, the bus control section 61 restores the video packet Pcv and the audio packet Pca by disassembling the bus packets BPcv and BPca, respectively, which are received after the start of the execution of the recording command ISrec. The bus control section 61 transmits the restored video packet Pcv and the audio packet Pca to the scheduled program storage device 62. The scheduled program storage device 62, corresponding to the scheduled program storage device 218 of FIG. 6, stores the received video packet Pcv and the received audio packet Pca.

Next, settings to be made before performing data communications in the broadcast system BS including the reception apparatus 2b according to the present variant will be described. Before performing data communications according to the present variants, the user operates the input device 31 to input the target identifier TID after the activation of the application execution section 32 of the communication terminal apparatus 3, in addition to the settings described above. The application execution section 32 stores the inputted target identifier TID in the target identifier storage section 37 (see FIG. 9).

Next, data communications to be performed in the present broadcast system BS will be described in detail. As described above, the user, who realizes, while away from home, that the user has forgotten to set a scheduled recording for a recording-scheduled broadcast program, operates the input device 31 of the communication terminal apparatus 3 to specify the proxy request program 321. In response to the specification, the application execution section 32 starts executing the proxy request program 321, after which the application execution section 32 generates the proxy request PR according to the information inputted by the user, and transmits it to the broadcast apparatus 1 via the communication line 4 (sequence Q11 of FIG. 10(a) and FIG. 10(b)). The proxy request PR of the present variant differs from that of FIG. 2(a) and FIG. 2(b) in that the command Cct further includes the target identifier TID stored in the target identifier storage section 37.

The broadcast apparatus 1 performs a process according to the procedure illustrated in FIG. 14 if it receives the proxy request PR of the present variant. If it is determined "No" in step S224, the received proxy request PR is stored in the request storage device 18, and the request_accepted signal RC is transmitted to the communication terminal apparatus 3 (see sequence Q13 of FIG. 10(b)).

Then, the broadcast apparatus 1 performs a process according to the procedure illustrated in FIG. 16, if the proxy request PR of the present variant is stored. In step S31, the information set Icom, which further includes the target identifier TID, is read out and sent to the command packet assembler 112. As a result, the TS transmitter 119 sends out the stream TS, in which the command packet Pct assembled from the information set Icom as described above is multiplexed, to the broadcast channel BCH described above (see sequence Q14 of FIG. 10(b)).

The reception apparatus 2 performs a process according to the procedure illustrated in FIG. 18, if it receives the stream TS of the present variant. Therefore, if it is determined "Yes" in both steps S48 and S49 and "No" in both steps S411 and S412, the command Cct multiplexed in the received stream TS is stored in the command storage section 211 as the command ACct.

Figure 25:
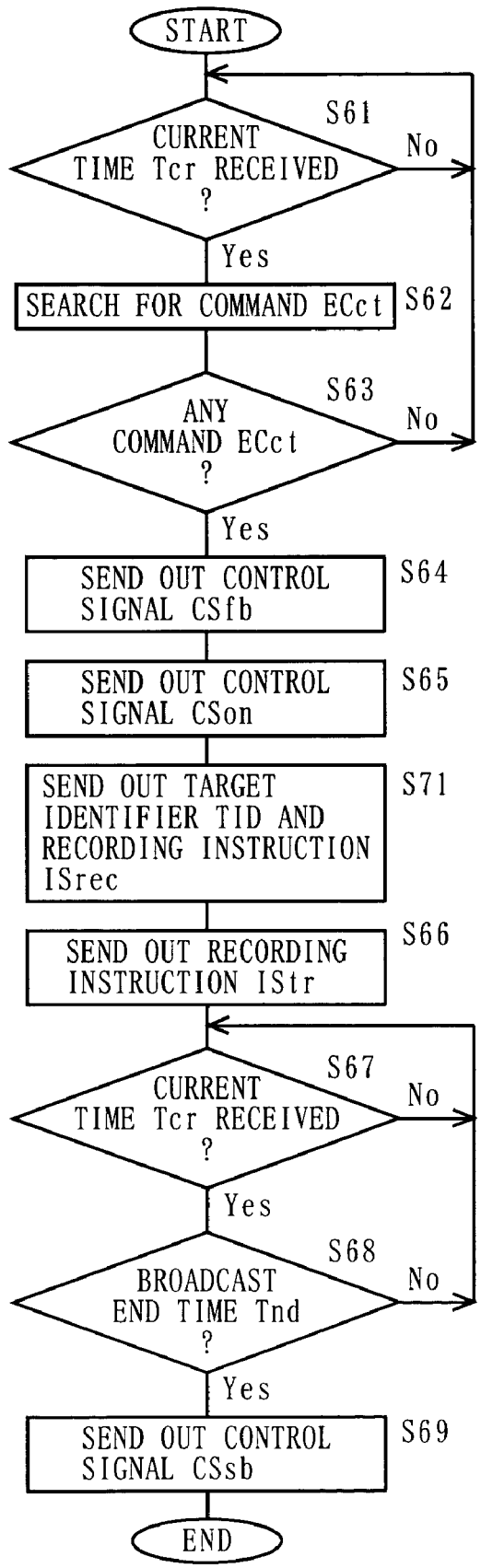
FIG. 25 is a flow chart illustrating the procedure of a process that a command execution section 51 of FIG. 24 performs when executing the command ACct stored in the command storage section 211.
Figure 26:
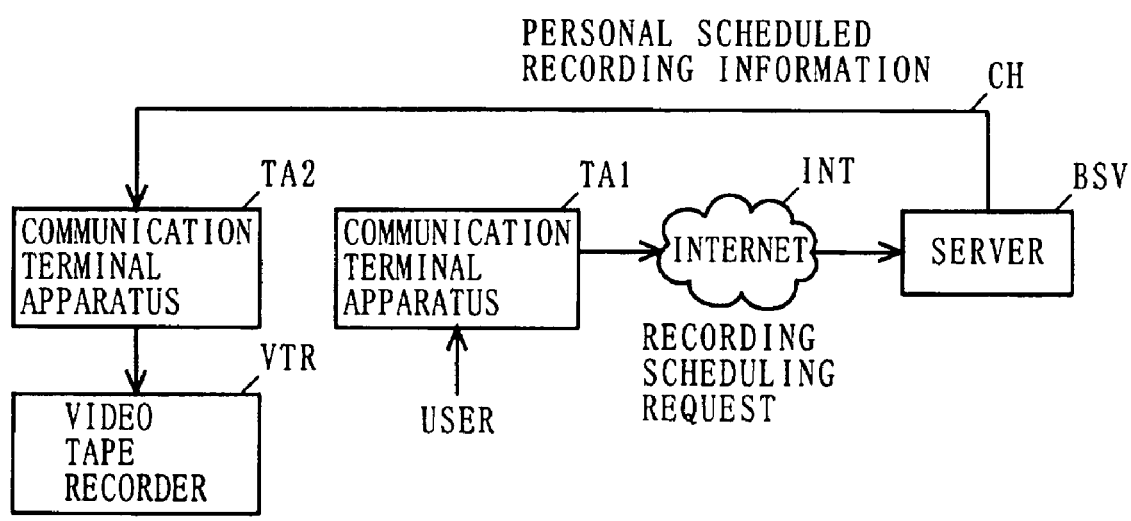
FIG. 26 is a schematic diagram illustrating a configuration of a conventional broadcast system.

Next, referring to the flow chart of FIG. 25, the process in which the command execution section 51 executes the command ACct stored in the command storage section 211 will be described. FIG. 25, as compared to FIG. 21, further includes steps S71 and S72, instead of step S66. Other than this, the flow charts do not differ from each other. Therefore, in FIG. 25, those steps already shown in FIG. 21 will be denoted by the same step numbers and will not be further described below. As with the command execution section 216, the command execution section 51 sends out the target identifier TID and the recording instruction ISrec included in the command ECct to the bus control section 52 after step S65 (step S71). Then, the command execution section 51 sends out the transfer instruction IStf as described above to the AV packet separation section 217 (step S72). As a result of step S65, the power supply 21 supplies the driving voltage Ecc not only to the AV packet separation section 217 but also to the bus control section 52. As a result of steps S71 and S72, the bus control section 52 first assembles the bus packet BPrec from the target identifier TID and the recording instruction ISrec received from the command execution section 51, and sends it out to the bus 7. Then, the bus control section 52 assembles the bus packets BPcv and BPca from the video packet Pcv and the audio packet Pca, respectively, which are received from the AV packet separation section 217, and sends them out to the bus 7. In the external recording device 6, the bus control section 61 receives and disassembles the first bus packet BPrec sent via the bus 7, and starts executing the recording instruction ISrec. The bus control section 61 receives and then disassembles the subsequent bus packets BPcv and BPca. The video packet Pcv and the audio packet Pca restored as described above are transferred to, and stored in, the scheduled program storage device 62 by the bus control section 61. This data storing process is constantly performed during the scheduled time period TPrp specified by the command ECct.

As described above, with the reception apparatus 2b of the present variant, the video packet Pcv and the audio packet Pca can be transferred also to the external recording device 6, which is connected to the reception apparatus 2b via the bus 7, thus further improving the usability.

Note that in the present variant, the reception apparatus 2b and the external recording device 6 are independent of each other. Therefore, the command Cct received by the reception apparatus 2b may not be executed as it is by the external recording device 6, as they may be from different manufacturers. Therefore, the command execution section 51 may alternatively output the received command Cct to the bus control section 52 after converting it to the recording instruction ISrec having a command format employed by the external recording device 6.

Moreover, the reception apparatus 2b and the external recording device 6 of the present variant may be connected to each other by a wireless connection. Moreover, in the present variant, in order for the determination/writing section 210 to know the free space FS of the scheduled program storage device 62 in the capacity determination process, the determination/writing section 210 can transmit an instruction therefor to the external recording device 6.

Moreover, while what is executed by the reception apparatuses 2, 2a and 2b is the scheduled recording command in the description above, the command is not limited to any particular type of command as long as the command includes at least a predetermined execution start time.

INDUSTRIAL APPLICABILITY

The broadcast system of the present invention can be used in a broadcast system capable of broadcasting data signals multiplexed with video and audio signals.

The invention claimed is:

1. A broadcast apparatus for broadcasting a stream to a reception apparatus, comprising:
 a request reception section for receiving a proxy request including an identifier assigned to the reception apparatus, a command to be transmitted to the reception apparatus, and an execution start time of the command to be transmitted to the reception apparatus;
 a timer for keeping a current time;
 a request determination section for determining whether or not to accept the proxy request received by the request reception section by using the execution start time included in the received proxy request and the current time kept by the timer;
 a proxy request storage device for storing the proxy request that is determined by the request determination section to be acceptable;
 a command extraction section for extracting a set of an identifier of the reception apparatus and a command for the reception apparatus from the proxy request stored in the proxy request storage device a plurality of times at a predetermined time interval;
 a command packet assembler for assembling a command packet from the set of the identifier and the command extracted by the command extraction section;
 a multiplexer for generating a stream in which the command packet assembled by the command packet assembler is multiplexed; and
 a transmitter for sending out the stream generated by the multiplexer to a broadcast channel,
 wherein the request determination section comprises:
  a first time calculation section for calculating a first amount of time required from when each command packet is sent out until the command packet arrives at the reception apparatus;
  a second time calculation section for calculating a second amount of time required from when a first command packet is assembled until a last command packet, including the same set of the identifier and the command as the first packet, is assembled;
  a reference time calculation section for calculating a reference time by which the proxy request from the reception apparatus should arrive at the present reception apparatus, based on the execution start time included in the proxy request received by the request reception section and the first and second amounts of time calculated by the first and second time calculation sections, respectively; and
  a determination section for determining that the proxy request received by the request reception section is unacceptable if the current time kept by the timer is after the reference time calculated by the reference time calculation section.

2. The broadcast apparatus according to claim 1, wherein the request reception section receives a proxy request transmitted by an external communication terminal apparatus, the broadcast apparatus further comprising:
 a request_accepted generation section for generating a request_accepted signal for notifying the communication terminal apparatus that the proxy request has been accepted by the request determination section; and
 a request_accepted transmission section for transmitting the request_accepted signal generated by the request_accepted generation section to the communication terminal apparatus.

3. The broadcast apparatus according to claim 1, wherein the request reception section receives a proxy request transmitted by an external communication terminal apparatus, the broadcast apparatus further comprising:
 a request determination section for discarding a proxy request that has been determined by the request determination section to be unacceptable;
 a request_rejected generation section for generating a request_rejected signal for notifying the communication terminal apparatus that the proxy request has been discarded by the request determination section; and
 a request_rejected transmission section for transmitting the request_rejected signal generated by the request_rejected generation section to the communication terminal apparatus.

4. The broadcast apparatus according to claim 1, further comprising:
 a broadcast program storage section for storing video data and audio data of a program to be broadcast from a predetermined broadcast start time to a predetermined broadcast end time;
 a video encoder for encoding the video data stored in the broadcast program storage section;

a video packet assembler for assembling a video packet from the video data encoded by the video encoder;
an audio encoder for encoding the audio data stored in the broadcast program storage section; and
an audio packet assembler for assembling an audio packet from the audio data encoded by the audio encoder, wherein,
the multiplexer generates a stream by multiplexing together the video packet assembled by the video packet assembler, the audio packet assembled by the audio packet assembler, and the command packet assembled by the command packet assembler; and
the proxy request received by the request reception section includes a scheduled recording command to be transmitted to the reception apparatus, a broadcast start time of a broadcast program to be recorded by scheduled recording, and a broadcast end time of the program.

5. The broadcast method for broadcasting a stream to a the reception apparatus, comprising:
   a request reception step of receiving a proxy request including an identifier assigned to the reception apparatus, a command to be transmitted to the reception apparatus, and an execution start time of the command to be transmitted to the reception apparatus;
   a request determination step of determining whether or not to accept the proxy request received in the request reception step by using the execution start time included in the received proxy request and a current time kept in the broadcast apparatus;
   a proxy request storage step of storing the proxy request that is determined in the request determination step to be acceptable;
   a command extraction step of extracting a set of an identifier of the reception apparatus and a command for the reception apparatus from the proxy request stored in the proxy request storage step a plurality of times at a predetermined time interval;
   a command packet assembling step of assembling a command packet from the set of the identifier and the command extracted in the command extraction step;
   a multiplexing step of generating a stream in which the command packet assembled in the command packet assembling step is multiplexed; and
   a send-out step of sending out the stream generated in the multiplexing step to a broadcast channel,
   wherein the request determination step comprises:
      a first time calculation step of calculating a first amount of time required from when each command packet is sent out until the command packet arrives at the reception apparatus;
      a second time calculation step of calculating a second amount of time required from when a first command packet is assembled until a last command packet, including the same set of the identifier and the command as the first packet, is assembled;
      reference time calculation step of calculating a reference time by which the proxy request from the reception apparatus should arrive at the broadcast apparatus, based on the execution start time included in the proxy request received in the request reception step and the first and second amounts of time calculated in the first and second time calculation steps, respectively; and
      a determination step of determining that the proxy request received in the request reception step is unacceptable if the current time is after the reference time calculated in the reference time calculation step.

* * * * *

UNITED STATES PATENT AND TRADEMARK OFFICE
CERTIFICATE OF CORRECTION

| | | |
|---|---|---|
| PATENT NO. | : 7,218,611 B2 | Page 1 of 1 |
| APPLICATION NO. | : 10/482799 | |
| DATED | : May 15, 2007 | |
| INVENTOR(S) | : Yoshihiro Mimura et al. | |

It is certified that error appears in the above-identified patent and that said Letters Patent is hereby corrected as shown below:

TITLE PAGE
Section (57), Abstract, line 23, "has bee" should read --has been--.

Column 29
Line 19, "to a the" should read --to a--.

Column 30
Line 22, "reference time" should read --a reference time--.

Signed and Sealed this

Thirteenth Day of November, 2007

JON W. DUDAS
*Director of the United States Patent and Trademark Office*